United States Patent
Ohnishi et al.

(10) Patent No.: US 9,684,207 B2
(45) Date of Patent: Jun. 20, 2017

(54) POLYMER FOR ALIGNMENT FILMS, AND LIQUID CRYSTAL DISPLAY DEVICE

(71) Applicant: Sharp Kabushiki Kaisha, Osaka (JP)

(72) Inventors: Yasuyuki Ohnishi, Osaka (JP); Masanobu Mizusaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 143 days.

(21) Appl. No.: 14/425,404

(22) PCT Filed: Aug. 27, 2013

(86) PCT No.: PCT/JP2013/072828
§ 371 (c)(1),
(2) Date: Mar. 3, 2015

(87) PCT Pub. No.: WO2014/038431
PCT Pub. Date: Mar. 13, 2014

(65) Prior Publication Data
US 2015/0234236 A1    Aug. 20, 2015

(30) Foreign Application Priority Data
Sep. 5, 2012  (JP) ................... 2012-195553

(51) Int. Cl.
*C09K 19/00* (2006.01)
*G02F 1/1337* (2006.01)
*C08G 73/10* (2006.01)

(52) U.S. Cl.
CPC ....... *G02F 1/133723* (2013.01); *C08G 73/10* (2013.01); *C08J 2379/08* (2013.01); *Y10T 428/10* (2015.01); *Y10T 428/1005* (2015.01)

(58) Field of Classification Search
CPC ............ G02F 1/1337; G02F 1/133711; G02F 1/133723; G02F 1/13378; G02F 1/133788;
(Continued)

(56) References Cited

U.S. PATENT DOCUMENTS

2003/0086044 A1    5/2003   Inoue et al.
2012/0092603 A1    4/2012   Mizusaki et al.

FOREIGN PATENT DOCUMENTS

JP    2003-177418 A   6/2003
WO   2011/001579 A1   1/2011

*Primary Examiner* — Ruiyun Zhang
(74) *Attorney, Agent, or Firm* — Chen Yoshimura LLP

(57) ABSTRACT

Provided are: a polymer for alignment films, which enables the production of a liquid crystal display device that is suppressed in image burn-in even if the light irradiation time is reduced; and a liquid crystal display device which is suppressed in image burn-in even if the light irradiation time is reduced. A polymer for alignment films, which has a main chain and a side chain that contains a structure represented by chemical formula —O—C($C_6H_5$)(CO—$C_6H_5$)—O—; and a liquid crystal display device which comprises a pair of substrates and a liquid crystal layer that is held between the pair of substrates, and wherein at least one of the substrates has an alignment film, on which a polymer layer for controlling the alignment of liquid crystal molecules is formed, and the alignment film is formed using a polymer for alignment films, which has a main chain and a side chain that contains a structure represented by chemical formula —O—C($C_6H_5$)(CO—$C_6H_5$)—O—.

16 Claims, 1 Drawing Sheet

(58) Field of Classification Search
CPC  C08G 73/10; C08G 73/1007; C08G 73/1042; C08J 2379/04; C08J 2379/08; Y10T 428/10; Y10T 428/1005; Y10T 428/1018; Y10T 428/1023
USPC .............. 428/1.1, 1.2, 1.25, 1.26; 349/123; 528/341, 340
See application file for complete search history.

POLYMER FOR ALIGNMENT FILMS, AND LIQUID CRYSTAL DISPLAY DEVICE

TECHNICAL FIELD

The present invention relates to a polymer for alignment films, and a liquid crystal display device. More specifically, the present invention relates to a polymer for alignment films used for forming alignment films, and a liquid crystal display device that controls an alignment property of liquid crystal molecules by using a polymer layer (hereinafter referred to as Polymer Sustained Alignment (PSA) layer; also called an alignment sustaining layer) formed by polymerizing monomers in a liquid crystal composition.

BACKGROUND ART

Liquid crystal display (LCD) devices are devices to control the transmission/shielding of light (on/off of display) by controlling the alignment of liquid crystal molecules having a birefringent property. Examples of LCD liquid crystal alignment modes include: a Twisted Nematic (TN) mode in which liquid crystal molecules with positive dielectric anisotropy are aligned in a twisted state in 90 degrees when viewing from a substrate normal direction; a vertical alignment (VA) mode in which liquid crystal molecules with negative dielectric anisotropy are aligned vertically to a substrate surface; and an in-plane switching (IPS) mode and a fringe field switching (FFS) mode, in which liquid crystal molecules with positive dielectric anisotropy are aligned horizontally to a substrate surface and a horizontal electric field is applied to a liquid crystal layer.

By forming an alignment film on a substrate, the liquid crystal display device can specify an initial orientation direction of the liquid crystal molecules by an interaction between side chains included in the alignment film and liquid crystal molecules. Further, in recent years, a technology in which the polymer layer (PSA layer) is formed by polymerizing monomers included in the liquid crystal composition to control the alignment of liquid crystal molecules has been drawing attention. In particular, a liquid crystal composition in which polymerizable components (hereinafter referred to as monomers for PSA) such as monomers, oligomers, or the like are mixed with the liquid crystal material is sealed between the substrates, and the PSA layer is formed by polymerizing the monomers for PSA by heating or light irradiation (e.g., with ultraviolet rays).

A method for further adding a polymerization initiator in the liquid crystal composition in addition to the monomers for PSA (e.g., see Patent Document 1), a method for adding polymerization initiator monomers (hereinafter referred to as polymerization initiator monomers) including a structure with a polymerization initiation function and including a radical polymerizable group, or the like have been considered as possible PSA techniques. Further, a method for forming an alignment film having a polymerization initiator functional group that has a function to start a polymerization reaction of the monomers for PSA on the substrate of the liquid crystal display device without adding the polymerization initiator or the polymerization initiator monomers to the liquid crystal composition (e.g., see Patent Document 2) has also been considered.

RELATED ART DOCUMENTS

Patent Document

Patent Document 1: Japanese Patent Application Laid-Open Publication No. 2003-177418
Patent Document 2: WO 2011/001579

SUMMARY OF THE INVENTION

Problems to be Solved by the Invention

An example of a method for polymerizing the monomers for PSA includes a method for radiating an ultraviolet ray onto the liquid crystal layer that includes the monomers for PSA. In consideration of shortening takt time, the ultraviolet ray irradiation time required for the polymerization of the monomers for PSA is preferably short. However, when the ultraviolet ray irradiation is short, the PSA layer is not sufficiently formed, so that the monomers for PSA remain in the liquid crystal layer, and this causes image burn-in. On the other hand, when the ultraviolet ray irradiation time is long, impurities are generated in the liquid crystal layer due to the deterioration of organic substances such as liquid crystal material, or the like, and this causes image burn-in.

Hereinafter, the cause of image burn-in will be described in detail. In a case of the vertical alignment mode as an example, at the time of an absence of an applied voltage, the liquid crystal molecules are aligned vertically with respect to the substrate surface. When the ultraviolet ray irradiation time is short, the PSA layer is not sufficiently formed and the unreacted monomers for PSA remain in the liquid crystal layer. When the voltage is applied in a state in which the liquid crystal molecules are aligned horizontally with respect to the substrate surface, the monomers for PSA are gradually polymerized by the light radiated from the backlight. Therefore, even when returning to the state of absence of the applied voltage again, the liquid crystal molecules tend not to return to the vertical direction with respect to the substrate surface, which causes image burn-in. Such image burn-in is also called tilt burn-in.

Further, when the ultraviolet irradiation time is long, radicals may be generated due to the deterioration of organic substances such as a liquid crystal material, or the like in an alignment film. An inner electric field is generated by the effect of the generated radicals. The voltage holding ratio (VHR) is reduced by this inner electric field, and a residual DC voltage (r-DC) is generated, and the driving voltage is varied, such that these cause image burn-in. Such image burn-in is also called electrical burn-in.

An example of a method for shortening the ultraviolet ray irradiation time includes a method for making a polymerization velocity of the monomers for PSA faster by adding the polymerization initiator or the polymerization initiator monomers to the liquid crystal composition, or the like.

In a case that the polymerization initiator is added to the liquid crystal composition, when the ultraviolet ray irradiation is short, the unreacted polymerization initiator remains in the liquid crystal layer. Therefore, this causes image burn-in due to the reduction of the VHR and the generation of the r-DC. Further, when the ultraviolet ray irradiation is not sufficient, the unreacted monomers for PSA remain in the liquid crystal layer, such that this causes the tilt burn-in. On the other hand, when the ultraviolet ray irradiation time is long, impurities are generated in the liquid crystal layer due to the deterioration of organic substances such as a liquid crystal material, or the like, and this causes the electrical burn-in.

In a case that the polymer initiator monomer is added to the liquid crystal composition, even though the ultraviolet ray irradiation is short and the unreacted polymerization initiator monomers remain, a polymerizable group is included in the molecules, so that the ratio of the monomers remained in the liquid crystal layer can be reduced by taking the monomers into the PSA layer. On the other hand, in a case that the polymerization initiator monomers are excessively added, the ratio of the unreacted polymerization initiator monomers is increased in the liquid crystal layer, which causes image burn-in.

Means for Solving the Problems

The present inventors studied various methods for shortening the takt time and preventing the cause of image burn-in, and focused on the method for forming an alignment film by using an alignment film material in which a side chain including a structure having the polymerization initiation function is introduced. According to such a method, when the ultraviolet ray is radiated, the radicals are generated from the side chain, which is a polymer for forming an alignment film; thus, the present inventors have found that without adding the polymerization initiator or the polymerization initiator monomers to the liquid crystal composition, the monomers for PSA are polymerized and the polymer layer (PSA layer) can be formed on the alignment film.

Further, the present inventors studied various issues to form a structure introducing the side chain of the polymer for alignment films. The present inventors have found that in a case that the structure of such side chains is hydrogen-drawing type, even though the polymerization velocity of the monomers for PSA by the ultraviolet irradiation is improved, the effect is small and this causes image burn-in when the ultraviolet irradiation is short. Specifically, the present inventors have found that the hydrogen-drawing type requires an existence of hydrogen donors near the excited side chain, and thus the radical generation probability is low, and the unreacted monomers for PSA remain in the liquid crystal layer. The present inventors have found that the value of VHR is lowered by the unreacted monomers for PSA, and that r-DC is generated, and further, that the image burn-in occurs due to the change of the tilt angle.

On the other hand, the present inventors have found that in a case that the structure introduced to the side chain of the polymer for alignment films is a self-cleavage type, radicals are generated in molecules itself, so that the radical generation probability is high, and the monomers for PSA can be sufficiently polymerized even when the ultraviolet irradiation time is short; thus, the takt time is short, and the cause of image burn-in can be prevented.

The present inventors have thereby arrived at the solution to the aforementioned problems and completed the present invention.

A polymer for alignment films includes a main chain; and a side chain including a structure represented by chemical formula (1) below:

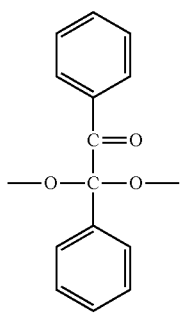

(1)

The main chain means a basic structure of the polymer for alignment films, and the examples of structures include a structure represented by the following chemical formula (3) which excludes $R^2$ and $R^3$ of a polyamic acid, and a structure represented by the following chemical formula (4) which excludes $R^4$ and $R^5$ of polyimide.

An average molecular weight of the aforementioned polymer for alignment films is preferably 3,000 to 1,000,000, and more preferably 10,000 to 100,000.

The structure of the polymer for alignment films of the present invention is not especially limited by other components as long as it essentially includes such components.

The structure represented by the chemical formula (1) is included in a structure represented by chemical formula (2) below:

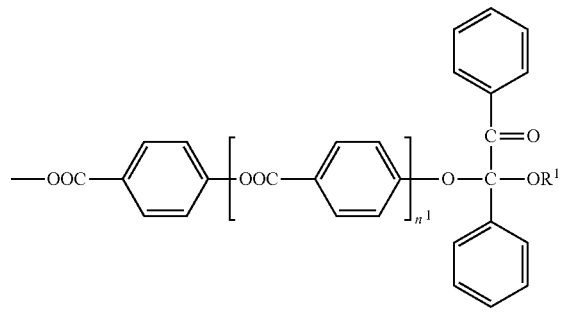

(2)

where $n^1$ is any integer from 0 to 3, and $R^1$ is a —H group, a saturated aliphatic hydrocarbon group with a carbon number of 4 or less, or an unsaturated aliphatic hydrocarbon group.

An example of the aforementioned polymer for alignment films includes a polyamic acid, a polyimide, polysiloxane, polyacryl, polymethacryl, or polyvinyl. Further, the polymer for alignment films may be polysilsesquioxane or polymaleimide.

An example of the aforementioned polymer for alignment films includes a polyamic acid or a polyimide in which an imidization ratio of the polymer for is 5 to 95%, and the imidization ratio is more preferably 10 to 90%.

An example of the aforementioned polymer for alignment films includes a polyamic acid including a structure represented by chemical formula (3) below:

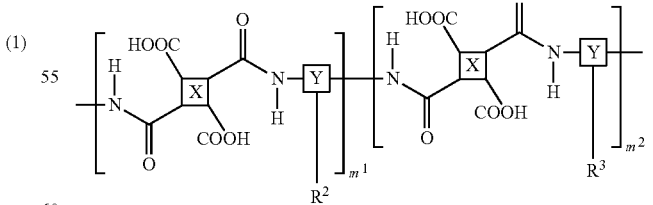

(3)

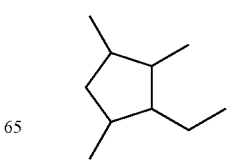

(3-1)

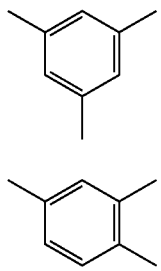

(3-2)

(3-3)

where X is chemical formula (3-1), Y is chemical formula (3-2) or chemical formula (3-3), $m^1$ and $m^2$ are non-negative integers, $R^2$ is a photoreactive functional group, a vertical alignment group, a horizontal alignment group, or a combination of these, and $R^3$ is chemical formula (5) below:

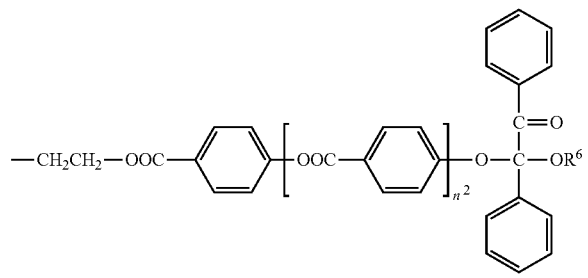

(5)

where $n^2$ is any integer from 0 to 3, $R^6$ is a —H group, a saturated aliphatic hydrocarbon group with a carbon number of 4 or less, or an unsaturated aliphatic hydrocarbon group.

An example of the aforementioned polymer for alignment films is a polyimide including a structure represented by chemical formula (4) below:

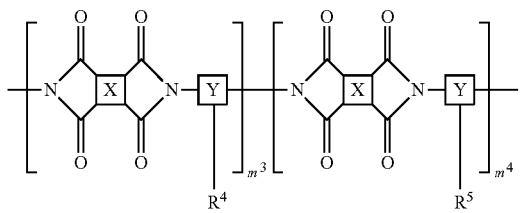

(4)

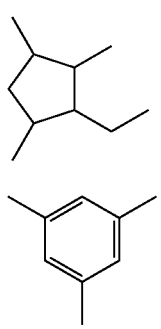

(4-1)

(4-2)

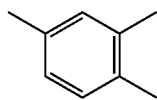

(4-3)

where X is chemical formula (4-1), Y is chemical formula (4-2) or chemical formula (4-3), $m^3$ and $m^4$ are non-negative integers, $R^4$ is a photoreactive functional group, a vertical alignment group, a horizontal alignment group, or a combination of these, and $R^5$ is chemical formula (5) below:

(5)

where $n^2$ is any integer from 0 to 3, $R^6$ is a —H group, a saturated aliphatic hydrocarbon group with a carbon count of 4 or less, or an unsaturated aliphatic hydrocarbon group.

The aforementioned vertical alignment group means a functional group to align the liquid crystal molecules vertically with respect to the substrate surface. The vertical alignment means that an average initial tilt angle of the liquid crystal molecules with respect to the substrate surface is 60° to 90°, and preferably 80° to 90°. Further, the aforementioned horizontal alignment group means a functional group to align the liquid crystal molecules horizontally with respect to the substrate surface. The horizontal alignment means that the average initial tilt angle of the liquid crystal molecules with respect to the substrate surface is 0 to 30°, and preferably 0 to 10°. The phrase "tilt angle" represents an angle between the long axis of the liquid crystal molecules and the substrate surface in a range of 0 to 90°, and the phrase "average tilt angle" is also called as "tilt angle". Further, an average of tilt angles of the liquid crystal molecules with respect to each substrate at the time of an absence of an applied voltage is called as "average initial tilt angle", and hereinafter, it is simply called as "pretilt angle".

An example of the aforementioned polymer for alignment films includes a photoreactive functional group. The photoreactive functional group is a functional group in which an alignment direction of the liquid crystal molecules can be specified by irradiating light.

An example of the aforementioned photoreactive functional group includes a cinnamate group, a chalcone group, a coumarin group, an azobenzene group, or a tolan group.

Another aspect of the present invention is a liquid crystal display device that includes: a pair of substrates; a liquid crystal layer disposed between the pair of substrates; an alignment film formed on at least one of the pair of substrates; and a polymer layer on the alignment film, the polymer layer controlling orientation of liquid crystal molecules in the liquid crystal layer, wherein the alignment film is formed by using a polymer for alignment films that has a main chain and a side chain, the side chain including a structure represented by chemical formula (1) below:

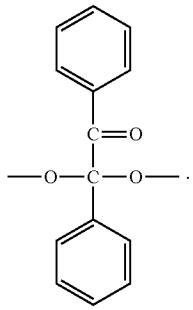
(1)

For example, one of the pair of substrates provided with the liquid crystal display device is used for an array substrate and the other one is used for a color filter substrate. The array substrate is provided with a plurality of pixel electrodes so as to control the alignment of the liquid crystal in a pixel unit. In the color filter substrate, the color filters of the plural colors are respectively arranged to superimpose the pixel electrodes so as to control the display color in pixel units.

The aforementioned liquid crystal layer includes a liquid crystal material having positive or negative dielectric anisotropy.

The structure of the liquid crystal display device of the present invention is not especially limited by other components as long as it essentially includes such components.

An example of the structure represented by chemical formula (1) is included in a structure represented by chemical formula (2) below:

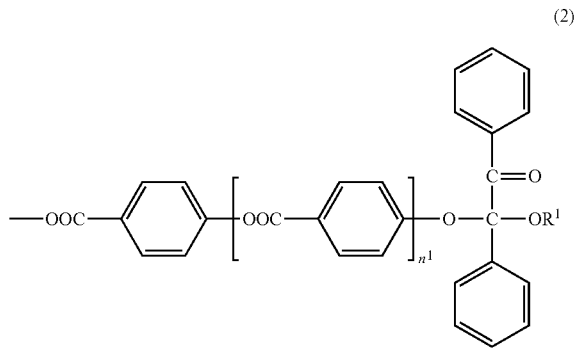
(2)

where $n^1$ is any integer from 0 to 3, $R^1$ is a —H group, a saturated aliphatic hydrocarbon group with a carbon count of 4 or less, or an unsaturated aliphatic hydrocarbon group.

An example of the aforementioned polymer for alignment films includes a polyamic acid, polyimide, polysiloxane, polyacryl, polymethacryl, or polyvinyl. Further, the polymer for alignment films may be polysilsesquioxane or polymaleimide.

An example of the aforementioned polymer for alignment films includes a polyamic acid or polyimide in which an imidization ratio of the polymer for alignment films is 5 to 95%, and the imidization ratio is more preferably 10 to 90%.

An example of the aforementioned polymer for alignment films includes a polyamic acid including a structure represented by chemical formula (3) below:

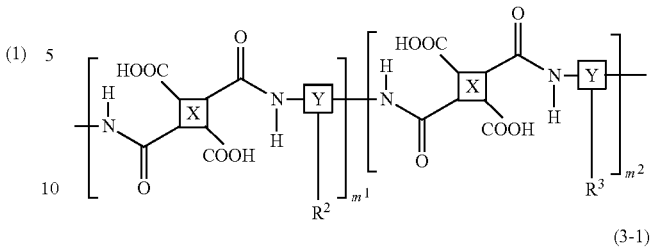
(3)

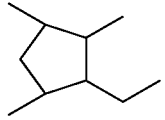
(3-1)

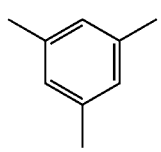
(3-2)

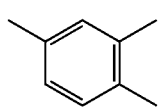
(3-3)

where X is chemical formula (3-1), Y is chemical formula (3-2) or chemical formula (3-3), $m^1$ and $m^2$ are non-negative integers, $R^2$ is a photoreactive functional group, a vertical alignment group, a horizontal alignment group, or a combination of these, and $R^3$ is chemical formula (5) below:

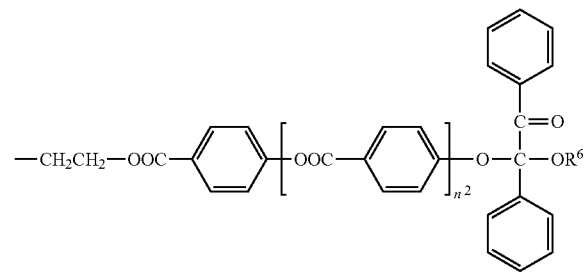
(5)

where $n^2$ is any integer from 0 to 3, $R^6$ is a —H group, a saturated aliphatic hydrocarbon group with a carbon count of 4 or less, or an unsaturated aliphatic hydrocarbon group.

An example of the polymer for alignment films includes a polyimide including a structure represented by chemical formula (4) below:

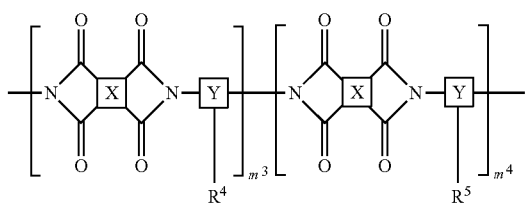
(4)

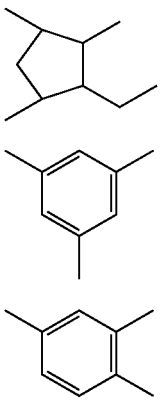

(4-1)

(4-2)

(4-3)

where X is chemical formula (4-1), Y is chemical formula (4-2) or chemical formula (4-3), $m^3$ and $m^4$ are non-negative integers, $R^4$ is a photoreactive functional group, a vertical alignment group, a horizontal alignment group, or a combination of these, and $R^5$ is chemical formula (5) below:

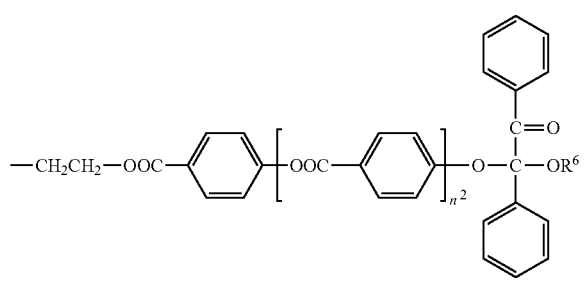

(5)

where $n^2$ is any integer from 0 to 3, $R^6$ is a —H group, a saturated aliphatic hydrocarbon group with a carbon count of 4 or less, or an unsaturated aliphatic hydrocarbon group.

The aforementioned vertical alignment group means a functional group to align the liquid crystal molecules vertically with respect to the substrate surface. The vertical alignment means that an average initial tilt angle of the liquid crystal molecules with respect to the substrate surface is 60° to 90°, and preferably 80° to 90°. Further, the aforementioned horizontal alignment group means a functional group to align the liquid crystal molecules horizontally with respect to the substrate surface. The horizontal alignment means that the average initial tilt angle of the liquid crystal molecules with respect to the substrate surface is 0 to 30°, and preferably 0 to 10°.

An example of the aforementioned polymer for alignment films includes a photoreactive functional group. The photoreactive functional group is a functional group in which an alignment direction of the liquid crystal molecules can be specified by irradiating light.

An example of the aforementioned photoreactive functional group includes a cinnamate group, a chalcone group, a coumarin group, an azobenzene group, or a tolan group.

An example of the aforementioned polymer layer includes one formed by polymerizing a radical polymerizable monomer.

An example of the radical polymerizable monomers are a compound represented by chemical formula (6) below:

$$P^1\text{-}Sp^1\text{-}R^8\text{-}A^1\text{-}(Z\text{-}A^2)_{n^3}\text{-}R^7 \quad (6)$$

(in the formula:

$R^7$ represents a —$R^8$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a C1 to C18 linear or branched alkyl group;

$P^1$ represents a radical polymerizable group;

$Sp^1$ represents a C1 to C6 linear, branched, or cyclic alkylene or alkyleneoxy group, or a direct bond;

a hydrogen atom in $R^7$ may be substituted with a fluorine atom or a chlorine atom;

a —$CH_2$— group in $R^7$ may be substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group as long as an oxygen atom and a sulfur atom are not adjacent to each other;

$R^8$ represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond;

$A^1$ and $A^2$ are the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

—$CH_2$— groups in $A^1$ and $A^2$ may be each substituted with an —O— group or an —S— group as long as the groups are not adjacent to each other;

hydrogen atoms in $A^1$ and $A^2$ may be each substituted with a fluorine atom, a chlorine atom, a —CN group, or a C1 to C6 alkyl, alkoxy, alkylcarbonyl, alkoxycarbonyl, or alkylcarbonyloxy group;

Z represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH═CH—COO— group, an —OCO—CH═CH— group, or a direct bond; and $n^3$ is 0, 1, or 2.)

More specific examples of the aforementioned radical polymerizable monomer include any of the compounds represented by the following chemical formulas (7-1) to (7-5).

[Chem. 14]

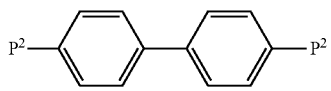
(7-1)

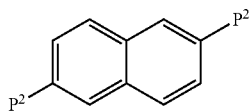
(7-2)

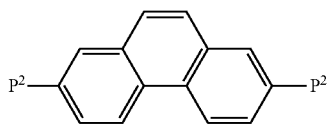
(7-3)

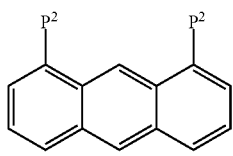
(7-4)

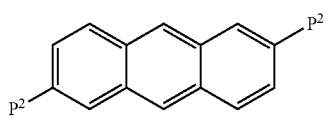
(7-5)

(in the formula, $P^2$ represents a radical polymerizable group.)

An example of the radical polymerizable group including the compounds represented by the aforementioned chemical formulas (6) and (7-1) to (7-5) includes an acrylate group, a methacrylate group, an acrylamide group, a methacrylamide group, a vinyl group, or a vinyloxy group.

Another aspect of the present invention is a manufacturing method of a liquid crystal display device including a step of forming an alignment film on at least one of a pair of substrates by using a polymer for alignment films including a main chain and a side chain including a structure represented by the following chemical formula (1); a step of filling a liquid crystal composition including a liquid crystal material and a radical polymerizable monomer disposed between the pair of substrates; and a step of forming a polymer layer controlling an alignment of liquid crystal molecules on the alignment film provided on at least one of the pair of substrates by irradiating light to the alignment film and the liquid crystal composition and polymerizing the radical polymerizable monomer.

[Chem. 15]

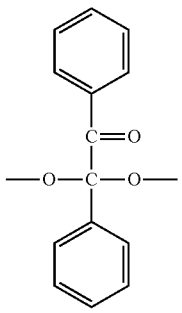
(1)

The manufacturing method of the liquid crystal display device of the present invention includes the step of filling the liquid crystal composition including the liquid crystal material and the radical polymerizable monomer disposed between the pair of substrates. The liquid crystal material may be a negative anisotropy of dielectric constant or a positive anisotropy of dielectric constant.

The manufacturing method of the liquid crystal display device of the present invention includes the step of forming the polymer layer controlling the alignment of liquid crystal molecules on the alignment film by irradiating light to the alignment film and the liquid crystal composition and polymerizing the radical polymerizable monomer. According to the manufacturing method of the present invention, the liquid crystal display device in which the takt time is short and the image burn-in is rarely caused is obtained.

The manufacturing method of the liquid crystal display device of the present invention is not especially limited by other steps as long as it essentially includes such steps.

In the manufacturing method of the liquid crystal display device of the present invention, a step of producing the aforementioned polymer for alignment films may be included before the step of forming the aforementioned alignment film.

An example of the step for producing the aforementioned polymer for alignment films includes a step in which a compound represented by the following chemical formula (8) or (9) is covalently bonded with the main chain of the polymer for alignment films.

[Chem. 16]

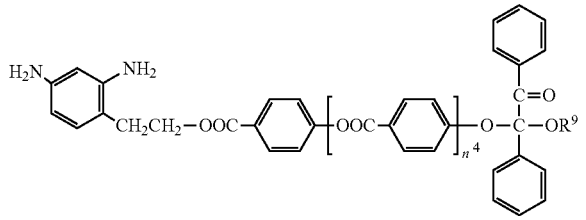
(8)

(wherein $n^4$ is any of integers of 0 to 3;

$R^9$ represents a —H group or a saturated aliphatic hydrocarbon group which is less than 4 C or an unsaturated aliphatic hydrocarbon group.)

[Chem. 17]

(9)

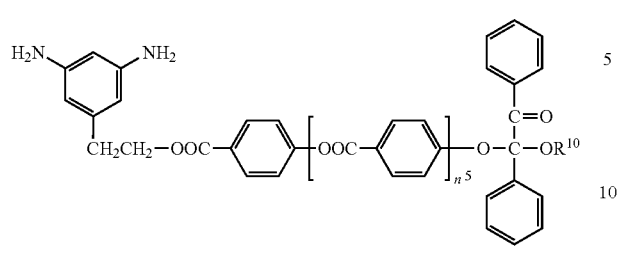

(wherein $n^5$ is any of integers of 0 to 3;

$R^{10}$ represents a —H group or a saturated aliphatic hydrocarbon group which is less than 4 C or an unsaturated aliphatic hydrocarbon group.)

An example of the structure represented by the aforementioned chemical formula (1) includes a structure represented by the following chemical formula (2).

[Chem. 18]

(2)

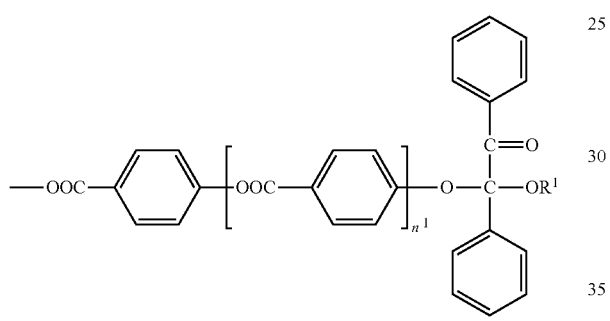

(wherein $n^1$ is any of integers of 0 to 3;

$R^1$ represents a —H group or a saturated aliphatic hydrocarbon group which is less than 4 C or an unsaturated aliphatic hydrocarbon group.)

An example of the aforementioned polymer for alignment films includes a polyamic acid, polyimide, polysiloxane, polyacryl, polymethacryl, or polyvinyl. Further, the aforementioned polymer for alignment films may be polysilsesquioxane or polymaleimide.

An example of the aforementioned polymer for alignment films includes a polyamic acid or polyimide in which an imidization ratio is 5 to 95% and more preferably 10 to 90%.

An example of the aforementioned polymer for alignment films includes a polyamic acid including a structure represented by a following chemical formula (3).

[Chem. 19]

(3)

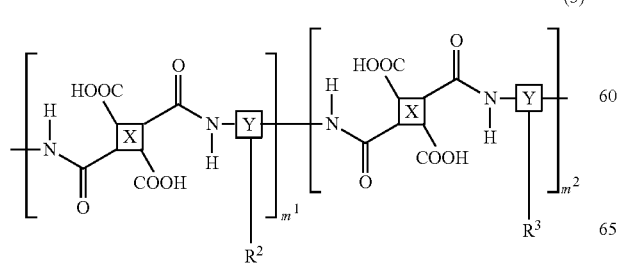

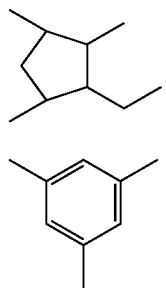

(3-1)

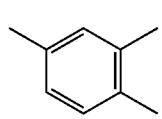

(3-2)

(3-3)

(wherein X represents chemical formula (3-1);

Y represents chemical formula (3-2) or chemical formula (3-3);

$m^1$ and $m^2$ represent a natural number;

$R^2$ represents a photoreactive functional group, a vertical alignment group, a horizontal alignment group or these combinations; and $R^3$ represents the following chemical formula (5).)

[Chem. 20]

(5)

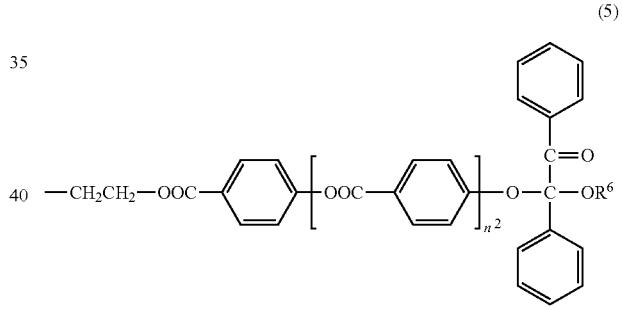

(wherein $n^2$ is any of integers of 0 to 3;

$R^6$ represents a —H group or a saturated aliphatic hydrocarbon group which is less than 4 C or an unsaturated aliphatic hydrocarbon group.)

An example of the aforementioned polymer for alignment films includes polyimide including a structure represented by the following chemical formula (4).

[Chem. 21]

(4)

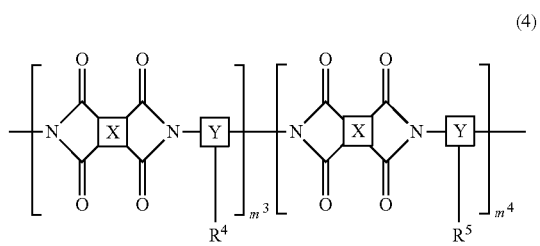

(4-1)

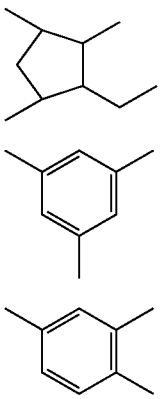

(4-2)

(4-3)

(wherein X represents chemical formula (4-1);
Y represents chemical formula (4-2) or chemical formula (4-3);
$m^3$ and $m^4$ represent a natural number;
$R^4$ represents a photoreactive functional group, a vertical alignment group, a horizontal alignment group or these combinations; and $R^5$ represents the following chemical formula (5).)

[Chem. 22]

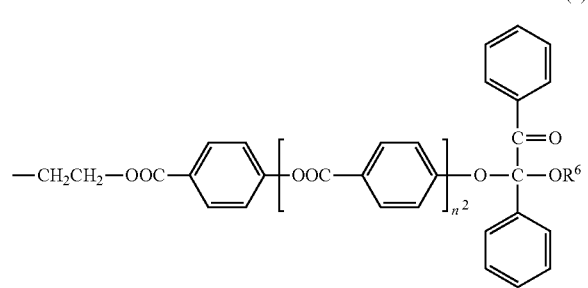

(5)

(wherein $n^2$ is any of integers of 0 to 3;
$R^6$ represents a —H group or a saturated aliphatic hydrocarbon group which is less than 4 C or an unsaturated aliphatic hydrocarbon group.)

The aforementioned vertical alignment group means a functional group to align the liquid crystal molecules vertically with respect to the substrate surface. The vertical alignment means that an average initial tilt angle of the liquid crystal molecules with respect to the substrate surface is 60° to 90°, and preferably 80° to 90°. Further, the aforementioned horizontal alignment group means a functional group to align the liquid crystal molecules horizontally with respect to the substrate surface. The horizontal alignment means that the average initial tilt angle of the liquid crystal molecules with respect to the substrate surface is 0 to 30°, and preferably 0 to 10°.

An example of the aforementioned polymer for alignment films includes a photoreactive functional group. The photoreactive functional group is a functional group in which an alignment direction of the liquid crystal molecules can be specified by irradiating light.

An example of the aforementioned photoreactive functional group includes a cinnamate group, a chalcone group, a coumarin group, an azobenzene group, or a tolan group.

An example of the aforementioned radical polymerizable monomer includes a compound represented by the following chemical formula (6).

[Chem. 23]

$P^1\text{-}Sp^1\text{-}R^8\text{-}A^1\text{-}(Z\text{-}A^2)_{n3}\text{-}R^7$ (6)

(in the formula, $R^7$ represents a —$R^8$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a C1 to C18 linear or branched alkyl group;
$P^1$ represents a radical polymerizable group;
$Sp^1$ represents a C1 to C6 linear, branched, or cyclic alkylene or alkyleneoxy group, or a direct bond;
a hydrogen atom in $R^7$ may be substituted with a fluorine atom or a chlorine atom;
a —$CH_2$— group in $R^7$ may be substituted with an —O— group, an —S— group, an —NH— group, a —CO— group, a —COO— group, an —OCO— group, an —O— group, an $OCH_2$ group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group as long as an oxygen atom and a sulfur atom are not adjacent to each other;
$R^8$ represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond;
$A^1$ and $A^2$ may be the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group; —$CH_2$— groups in $A^1$ and $A^2$ each may be substituted with an —O— group or an —S— group as long as these groups are not adjacent to each other;
hydrogen atoms in $A^1$ and $A^2$ each may be substituted with a fluorine atom, a chlorine atom, a —CN group, or a C1 to C6 alkyl, alkoxy, alkylcarbonyl, alkoxycarbonyl, or alkylcarbonyloxy group;
Z represents an —O— group, an —S— group, an —NH— group, a —CO— group, a —COO— group, an —OCO— group, an —O—COO— group, an —$OCH_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CFS— group, an —SCF— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; and n$^3$ is 0, 1, or 2.)

Examples of the aforementioned radical polymerizable monomers include any of the compounds represented by the following chemical formulas (7-1) to (7-5).

[Chem. 24]

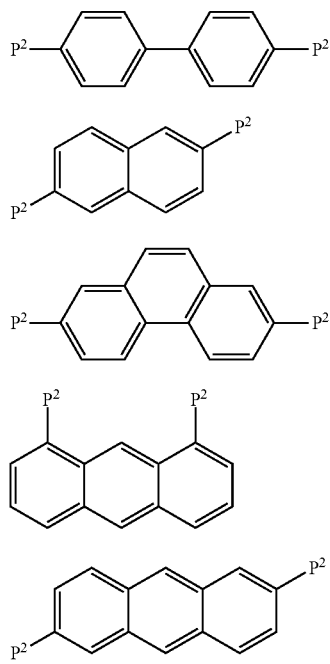

(7-1)
(7-2)
(7-3)
(7-4)
(7-5)

(in the formula, P$^2$ represents a radical polymerizable group.)

An example of the radical polymerizable group including the compounds represented by the aforementioned chemical formulas (6) and (7-1) to (7-5) includes an acrylate group, a methacrylate group, an acrylamide group, a methacrylamide group, a vinyl group, or a vinyloxy group.

Effects of the Invention

According to the polymer for alignment films of the present invention, even when the light irradiation time is shortened, a liquid crystal display device which rarely causes image burn-in can be produced, and even when the light irradiation time is shortened, a liquid crystal display device which rarely causes image burn-in can be provided.

DETAILED DESCRIPTION EMBODIMENTS

Hereinafter, the present invention will be further described in the following embodiments with reference to the drawings, but the present invention is not limited to these embodiments. The liquid crystal display device produced by using the polymer for alignment films of the present invention and the liquid crystal display device of the present invention are used in, for example, display devices such as a television, a personal computer, a mobile phone, an information display, or the like, so that the excellent display properties can be demonstrated.

Embodiment 1

Figure 1:
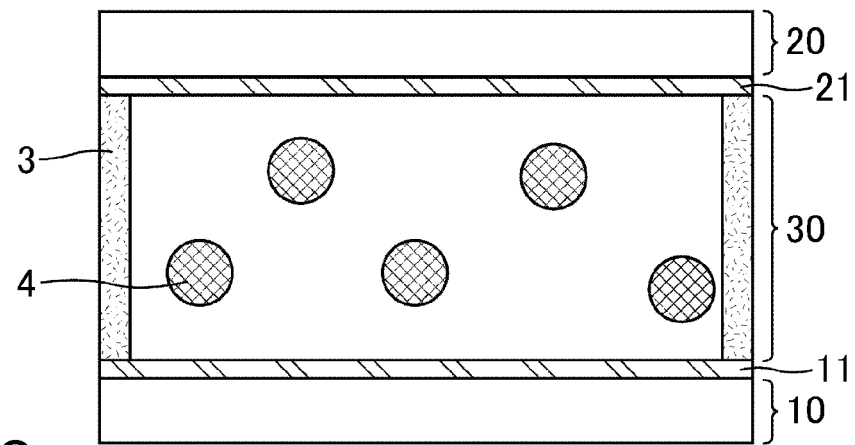
FIG. 1 is a schematic diagram showing a cross-sectional surface of a liquid crystal display device according to Embodiment 1 before a PSA polymerization process.
Figure 2:
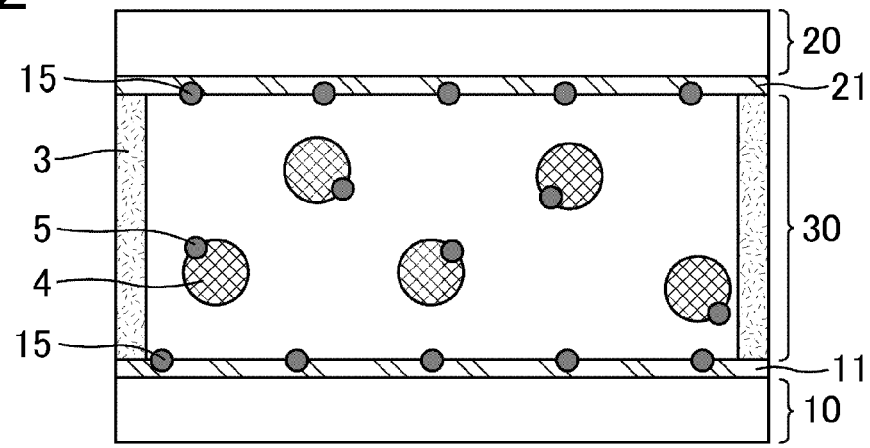
FIG. 2 is a schematic diagram showing a cross-sectional surface of a liquid crystal display device according to Embodiment 1 at the time of light irradiation in the PSA polymerization process.
Figure 3:
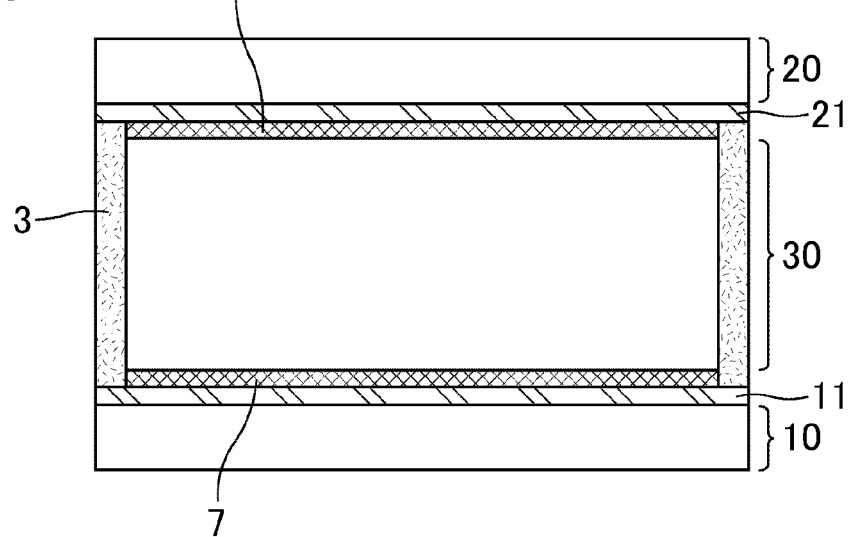
FIG. 3 is a schematic diagram showing a cross-sectional surface of the liquid crystal display device according to Embodiment 1 after the PSA polymerization process.

Hereinafter, an example of a method for producing a liquid crystal display device according to Embodiment 1 will be described. FIGS. 1 to 3 are a schematic diagram showing a cross-sectional surface of the liquid crystal display device according to Embodiment 1. FIG. 1 shows the cross-sectional surface of the liquid crystal display device before the PSA polymerization process. FIG. 2 shows the cross-sectional surface of the liquid crystal display device at the time of light irradiation in the PSA polymerization process. FIG. 3 shows the cross-sectional surface of the liquid crystal display device after the PSA polymerization process.

As shown in FIGS. 1 to 3, the liquid crystal display device according to Embodiment 1 is provided with an array substrate 10, a color filter substrate 20, and a liquid crystal layer 30 disposed between the array substrate 10 and the color filter substrate 20. The array substrate 10 is provided with an insulating transparent substrate, for example, made of glass, or the like, various wiring lines formed on the transparent substrate, pixel electrodes, and thin film transistors (TFTs), or the like. The color filter substrate 20 is provided with an insulating transparent substrate, for example, made of glass, or the like, and a color filter, a black matrix, a common electrode, or the like formed on the transparent substrate. The array substrate 10 and the color filter substrate 20 are respectively provided with the alignment films 11 and 21 on the surfaces on the liquid crystal layer 30 side.

The alignment films 11 and 21 are formed by applying the treatment and calcination of a polymer for alignment films having a side chain, which includes a structure having a self-cleavage type polymerization initiation function, on the surfaces of the array substrate 10 and the color filter substrate 20. An alignment treatment may be applied to the alignment films 11 and 21, or the alignment treatment may not be applied. Examples of the alignment treatment method include a rubbing treatment and a light alignment treatment.

As shown in FIG. 1, before the PSA polymerization process, the liquid crystal layer 30 includes a liquid crystal material and radical polymerizable monomers 4. The PSA layer is formed by radiating the light on the alignment films 11 and 21 and the liquid crystal layer 30.

As shown in FIG. 2, the alignment films 11 and 21 include a side chain including the structure having the self-cleavage type polymerization initiation function, so that radicals 15 are generated by irradiating the light. The radical polymerizable monomers 4 also generate radicals 5 by irradiation. As shown in FIG. 3, the polymers formed by which the radical polymerizable group included in the radical polymerizable monomers 4 starts, proceeds, and polymerizes a chain polymerization one after another when the radicals 5 and 15 become active types deposited on the alignment films 11 and 21, which are formed on the substrates 10 and 20, as a polymer layer (PSA layer) 7.

In a case that a general polymerization initiator is used, one cleaved by the ultraviolet ray irradiation floats in the liquid crystal layer as an impurity, so that the VHR is lowered, and the r-DC is generated, and this causes image burn-in. Further, in a case that the polymerization initiator monomer is used, when the additive amount becomes large, the ratio of the unreacted monomers in the liquid crystal layer increases, so that the VHR is lowered, and the r-DC is generated, and this causes image burn-in. In Embodiment 1, the alignment films are formed by using the polymer for alignment films having a side chain including the structure, which has the self-cleavage type polymerization initiation function, so that the side chains of the alignment films 11 and 21 and the radical polymerizable monomers 4 respectively generate the radicals 5 and 15. Therefore, even when the ultraviolet ray irradiation time is short, the polymer layers can be formed, and the cause of image burn-in can be suppressed.

Further, the alignment films are formed by the aforementioned polymer for alignment films; therefore, the radicals can be intensively generated on the interface between the alignment films 11 and 21 and the liquid crystal layer 30, and the polymer layer 7 can be effectively formed on the alignment films 11 and 21.

As shown in FIG. 3, in Embodiment 1, the polymer layers 7 are formed on the surface of the alignment films 11 and 21 provided with the array substrate 10 and the color filter substrate 20. Further, sealing materials 3 are attached on the alignment films 11 and 21 along the outer edges of the substrates 10 and 20 between the array substrate 10 and the color filter substrate 20, so that the liquid crystal layer 30 is sealed between the array substrate 10 and the color filter substrate 20 by the sealing materials 3. Further, the light irradiation of the liquid crystal layer 30 is performed after the liquid crystal layer 30 was sealed by the sealing materials 3, so that the polymer layers 7 are formed within the region surrounded by the sealing materials 3.

In Embodiment 1, when the PSA polymerization process is performed, by performing the light irradiation in a state in which the voltage, which is greater than the threshold value, is applied to the liquid crystal layer 30, the polymers are formed in a shape complying with the liquid crystal molecules aligned by applying the voltage which is greater than the threshold value. In this case, the formed polymer layer has a structure specifying a pre-tilt angle with respect to the liquid crystal molecules even in the state of absence of the applied voltage. Further, by applying the alignment process to the alignment films 11 and 21, when the PSA polymerization process is performed, without applying voltage, which is greater than the threshold value, to the liquid crystal layer 30, the polymer layer can be formed, and the liquid crystal molecules can be aligned with respect to the substrate surface in a specific direction.

Other constituents of the liquid crystal display device according to Embodiment 1 will be described in detail.

The aforementioned polymer for alignment films is obtained by introducing the structure having the self-cleavage type polymerization initiation function to the side chain. Hereinafter, a method for synthesizing the polymer for alignment films will be described.

Initially, by adding acid anhydride represented by the following chemical formula (13) to a γ-butyrolactone solution, in which the compound including the structure having the self-cleavage type polymerization initiation function and the compound having a vertical alignment group or a horizontal alignment group are dissolved, and by reacting the resultant, a polyamic acid with a random structure is obtained. The aforementioned compound may have a photoreactive functional group.

[Chem. 25]

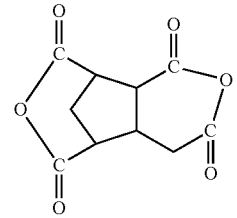

(13)

An example of the aforementioned structure having the self-cleavage type polymerization initiation function includes a structure representing the following chemical formula (1).

[Chem. 26]

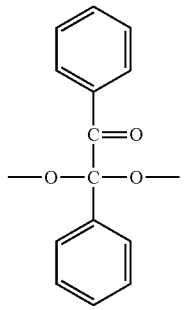

(1)

An example of the structure represented by the aforementioned chemical formula (1) includes a structure representing the following chemical formula (2).

[Chem. 27]

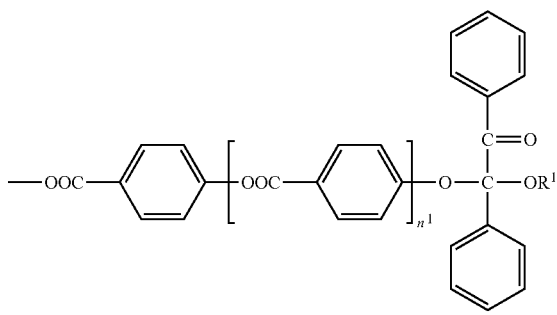

(2)

(wherein $n^1$ is any of integers of 0 to 3; and $R^1$ represents —H group or saturated aliphatic hydrocarbon group which is less than 4 C, or unsaturated aliphatic hydrocarbon group.)

Further, a specific example of the compound including the structure having the aforementioned self-cleavage type polymerization initiation function includes benzyl ketal diamine compound represented by the following chemical formulas (8) and (9).

[Chem. 28]

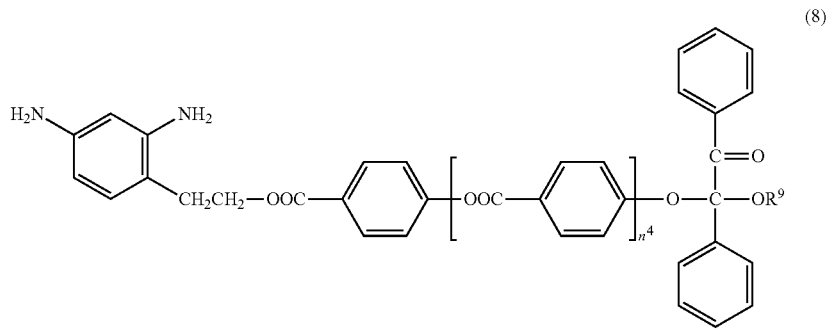

(8)

(wherein $n^4$ is any of integers of 0 to 3; and $R^9$ represents —H group or saturated aliphatic hydrocarbon group which is less than 4 C or unsaturated aliphatic hydrocarbon group.)

[Chem. 29]

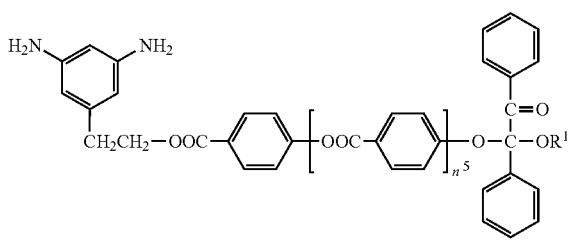

(9)

(wherein $n^5$ is any of integers of 0 to 3; and $R^{10}$ represents —H group or saturated aliphatic hydrocarbon group which is less than 4 C or unsaturated aliphatic hydrocarbon group.)

An example of the composition having a photoreactive functional group includes the compounds represented by the following chemical formulas (10-1) to (10-24).

[Chem. 30-1]

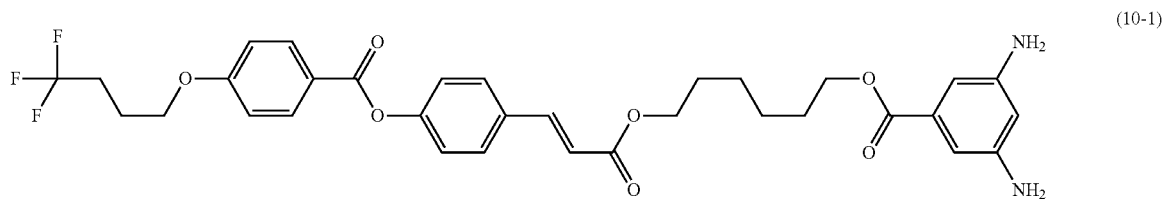

(10-1)

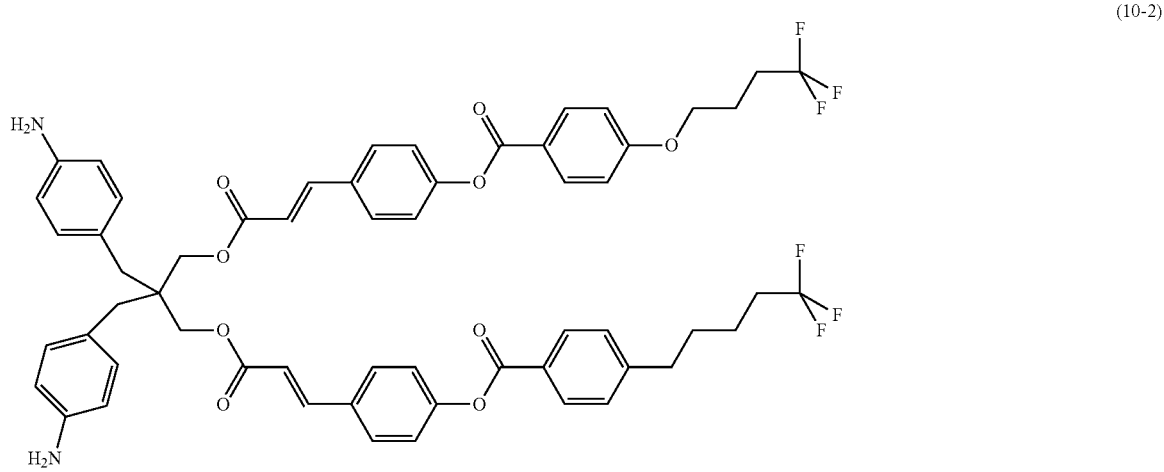

(10-2)

(10-3)
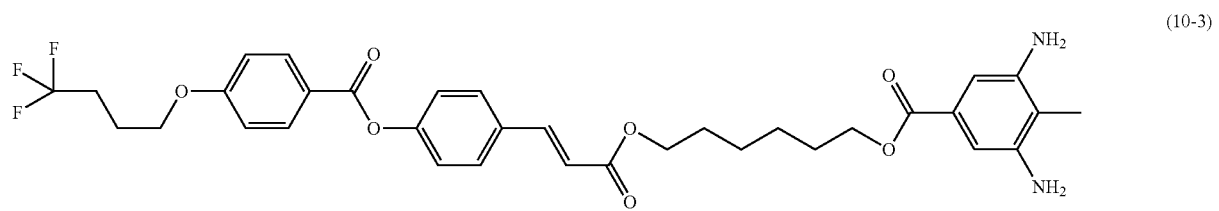
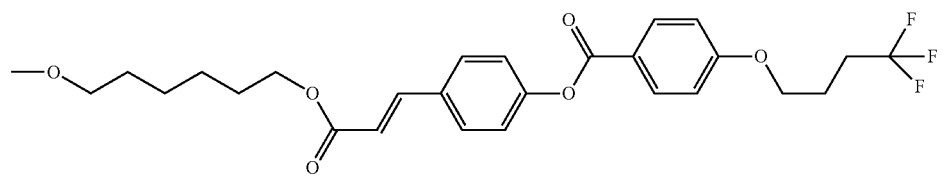
(10-4)
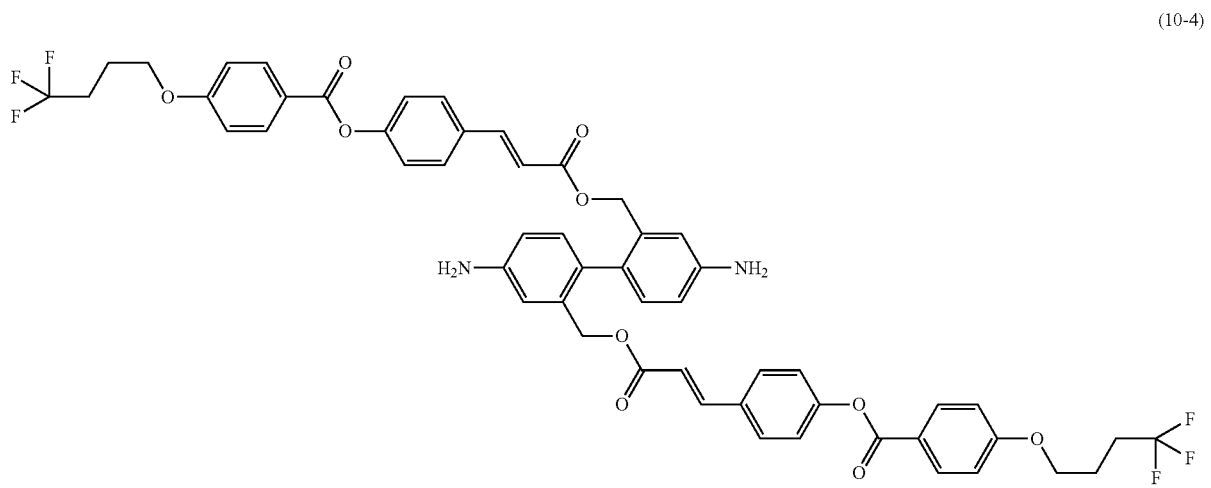
(10-5)
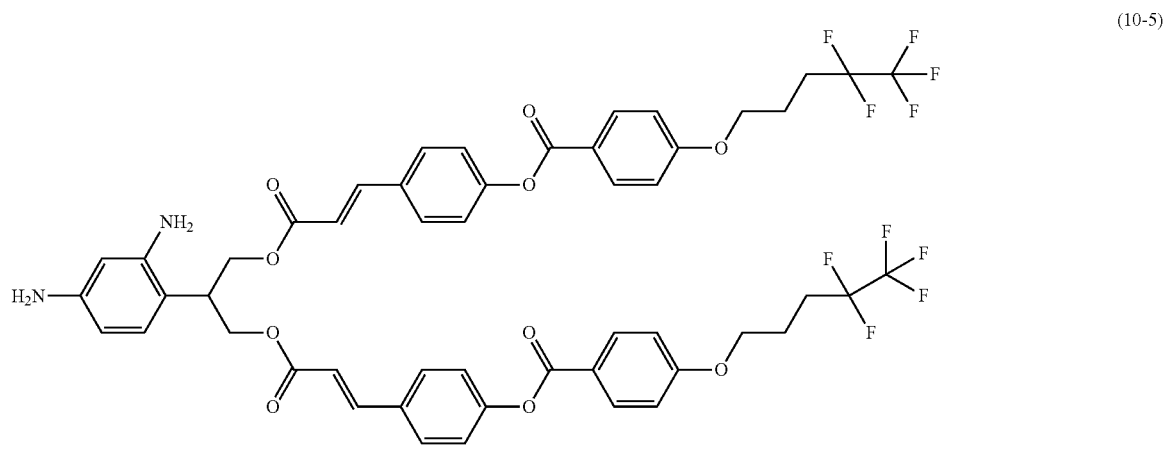

-continued
(10-6)
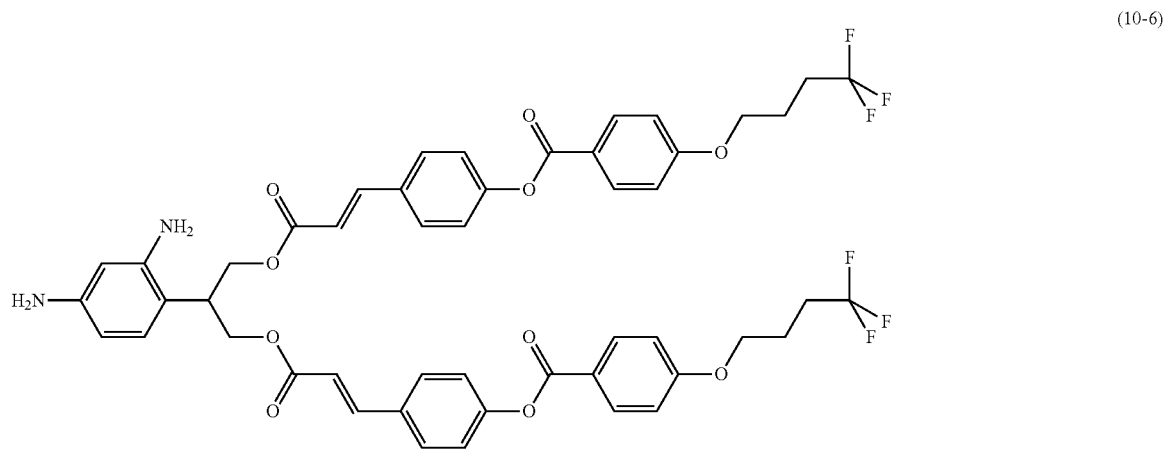
(10-7)
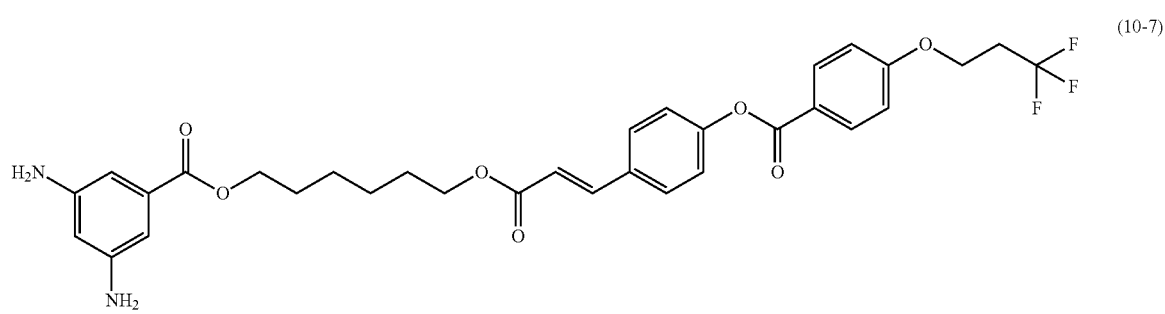
(10-8)
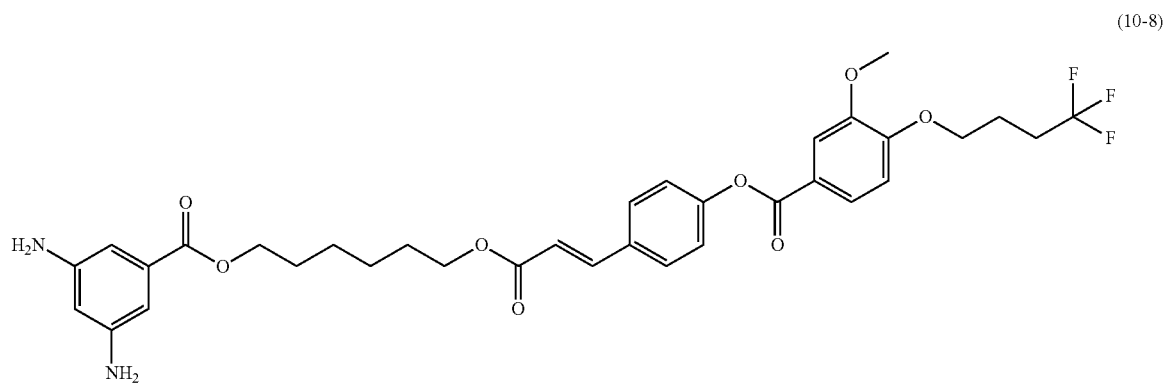
(10-9)
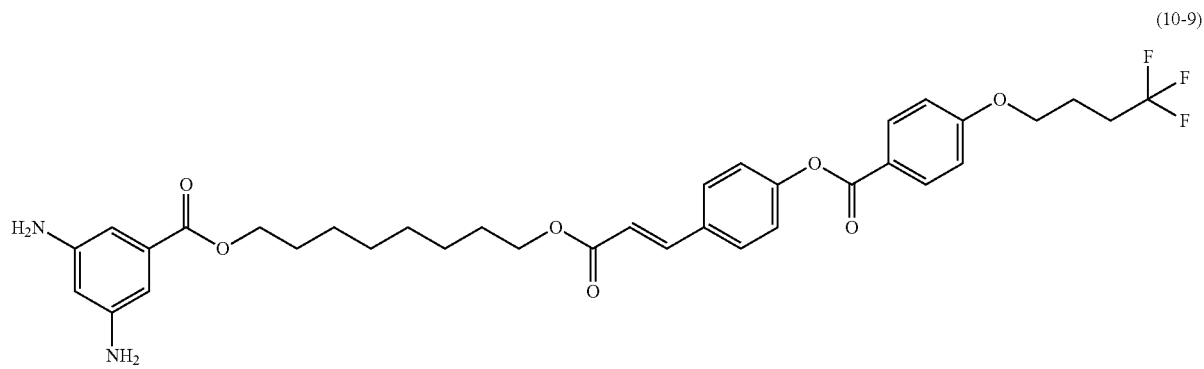

-continued
(10-10)
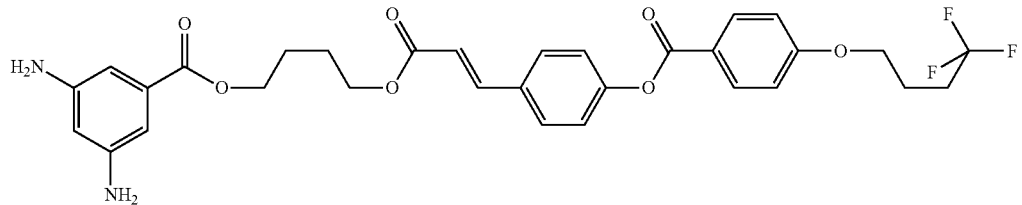
[Chem. 30-3]
(10-11)
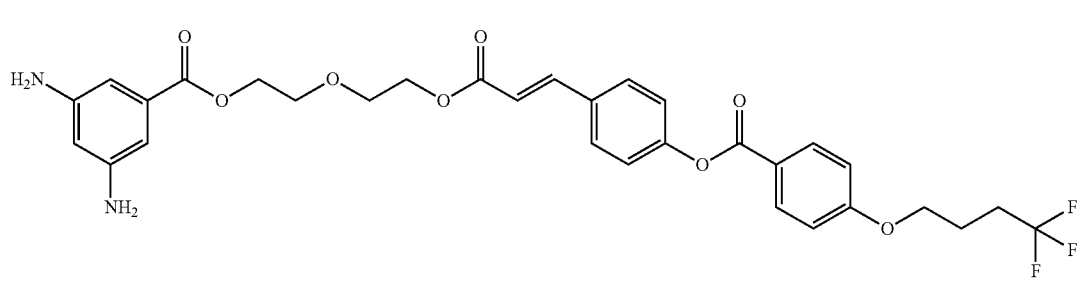
(10-12)
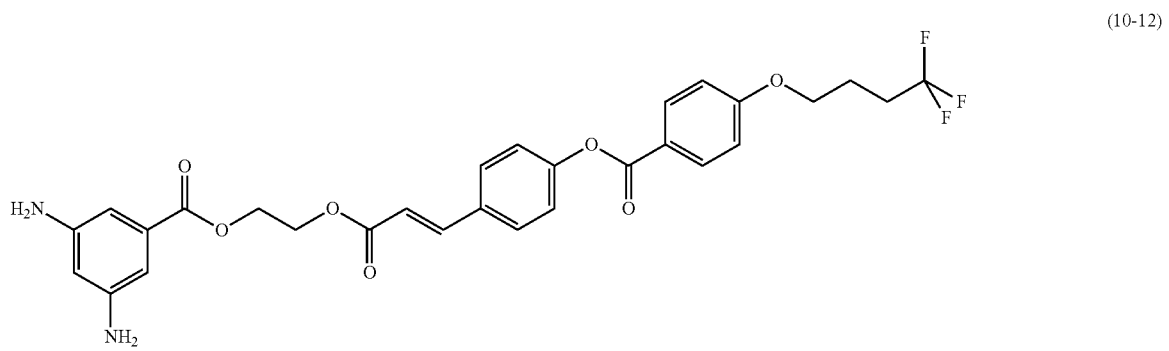
(10-13)
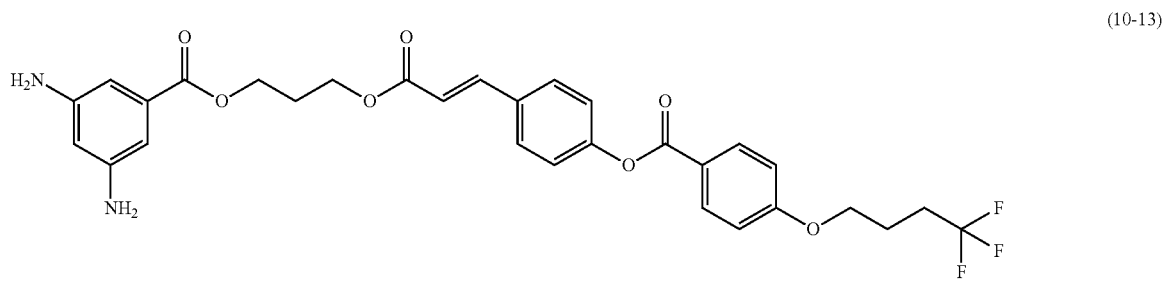
(10-14)
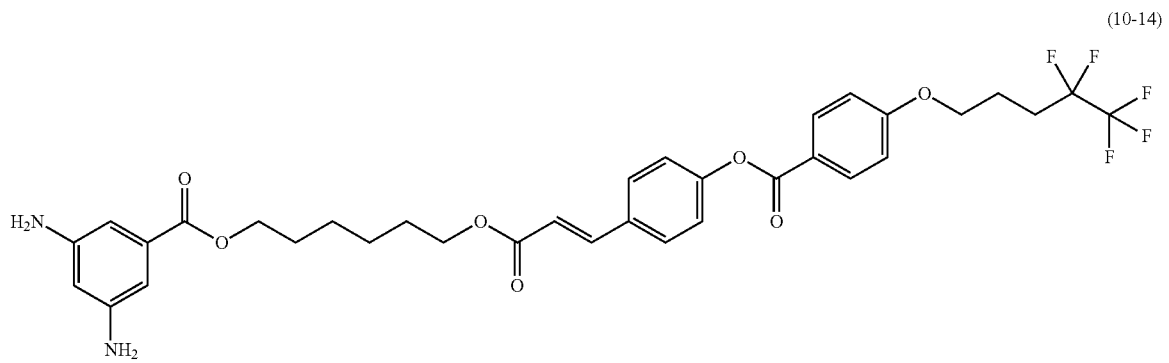

(10-15)
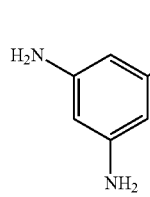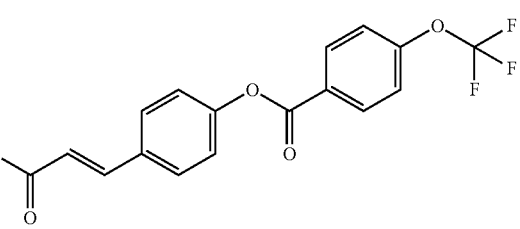
(10-16)
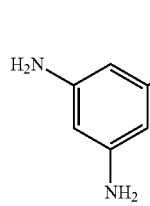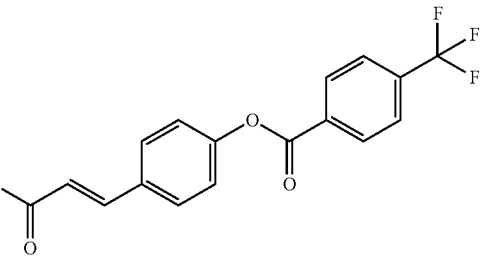
[Chem. 30-4]
(10-17)
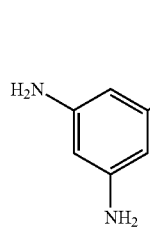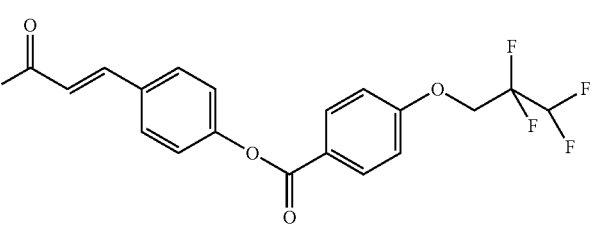
(10-18)
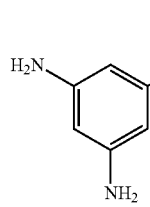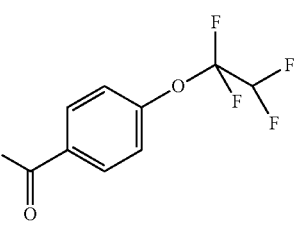
(10-19)
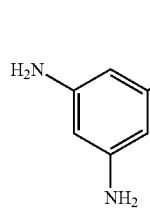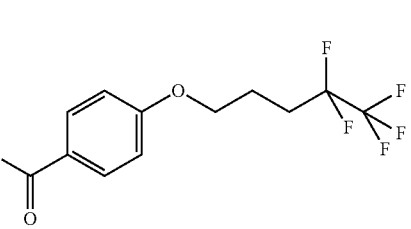
(10-20)
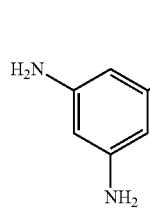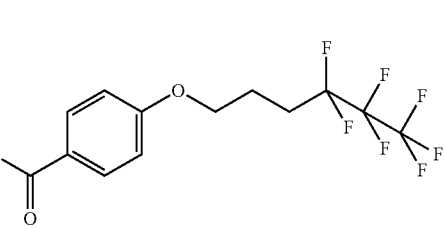

-continued
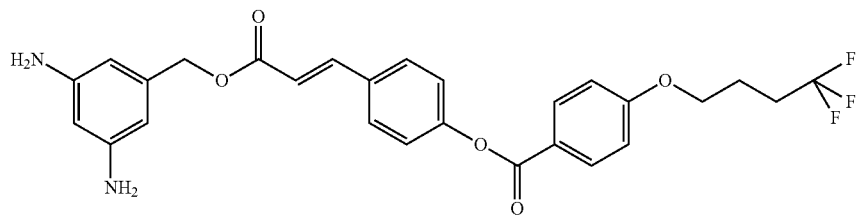
(10-21)
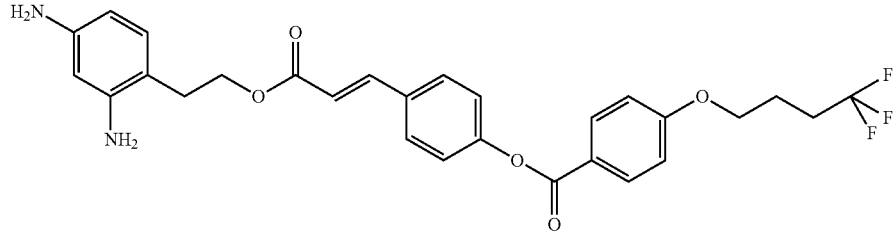
(10-22)
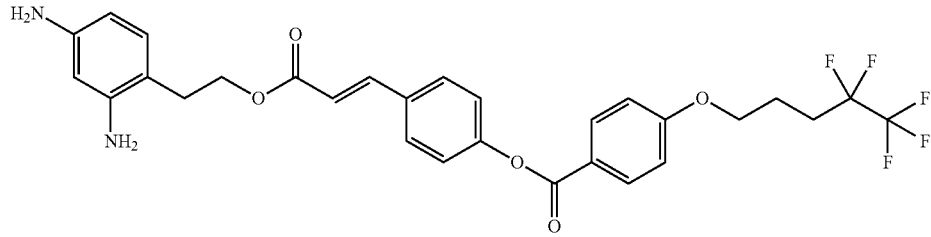
(10-23)
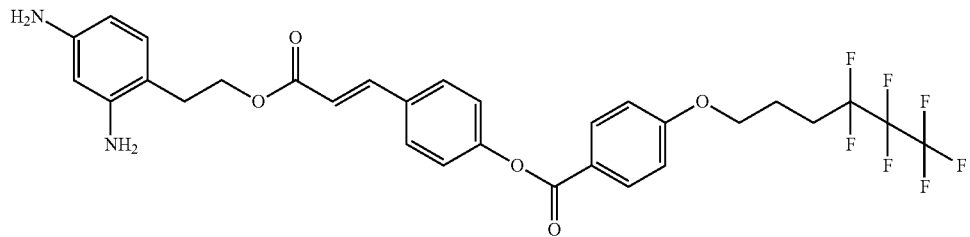
(10-24)
An example of the compound having a vertical alignment group includes the compounds represented by the following chemical formulas (11-1) to (11-4).
[Chem. 31]
-continued
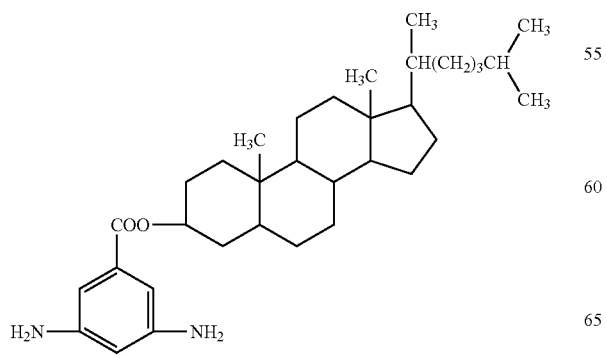
(11-1)
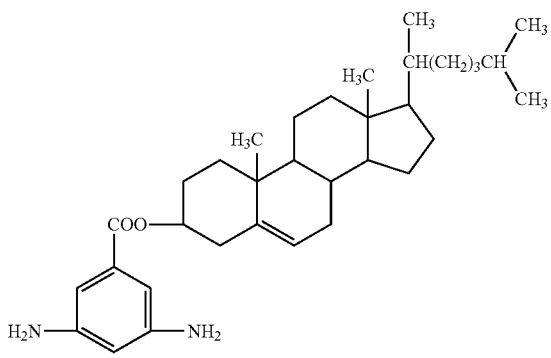
(11-2)

(11-3)

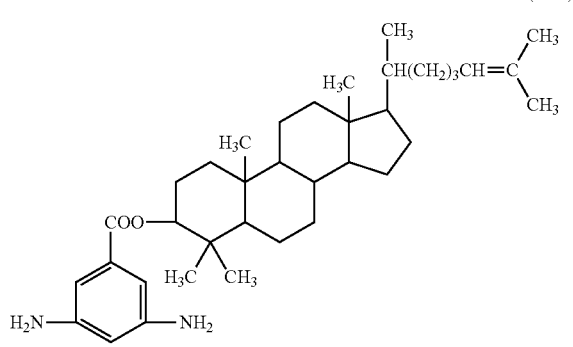

(11-4)

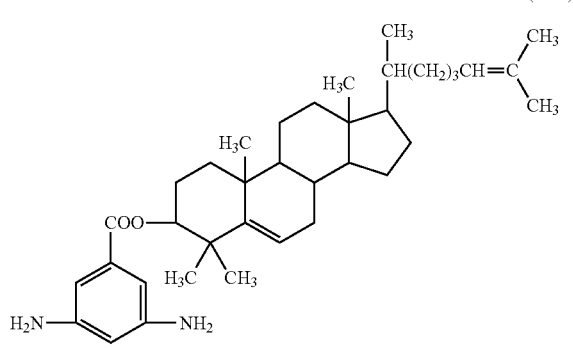

An example of the compound having a horizontal alignment group includes the compounds represented by the following chemical formulas (12-1) to (12-6).

[Chem. 32]

(12-1)

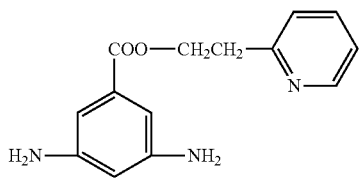

(12-2)

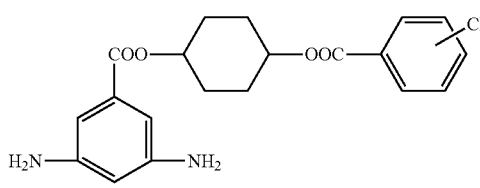

(12-3)

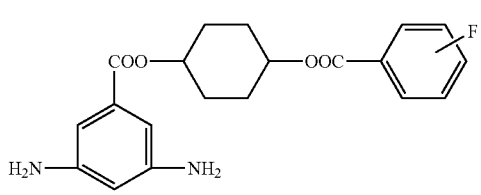

(12-4)

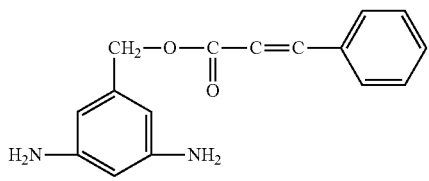

(12-5)

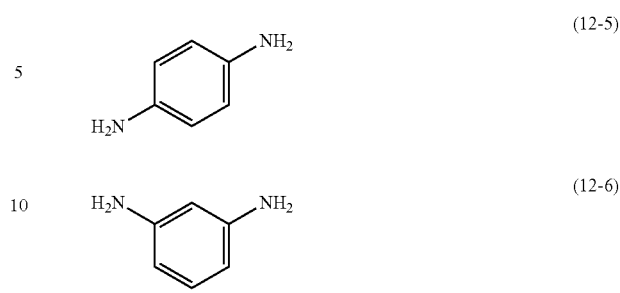

(12-6)

Next, an excess of pyridine and acetic acid anhydride are added to and reacted with the obtained γ-butyrolactone solution of the polyamic acid with a random structure and the imidization is performed.

By the aforementioned processes, for example, a polyamic acid including the structure represented by the following chemical formula (3), polyimide including the structure represented by the following chemical formula (4), or copolymer including a polyamic acid including the structure represented by the following chemical formula (3) and the structure represented by the following chemical formula (4) are obtained. The imidization ratio is preferably 5 to 95%, and more preferably 10 to 90%.

[Chem. 33]

(3)

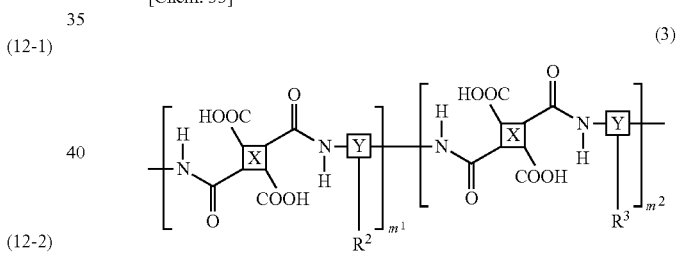

(3-1)

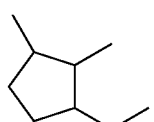

(3-2)

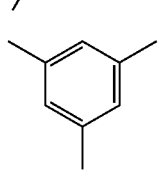

(3-3)

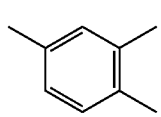

(wherein X represents chemical formula (3-1);

Y represents chemical formula (3-2) or chemical formula (3-3);

$m^1$ and $m^2$ represent a natural number;

R² represents a photoreactive functional group, a vertical alignment group, a horizontal alignment group or these combinations; and R³ represents the following chemical formula (5)).

[Chem. 34] (4)

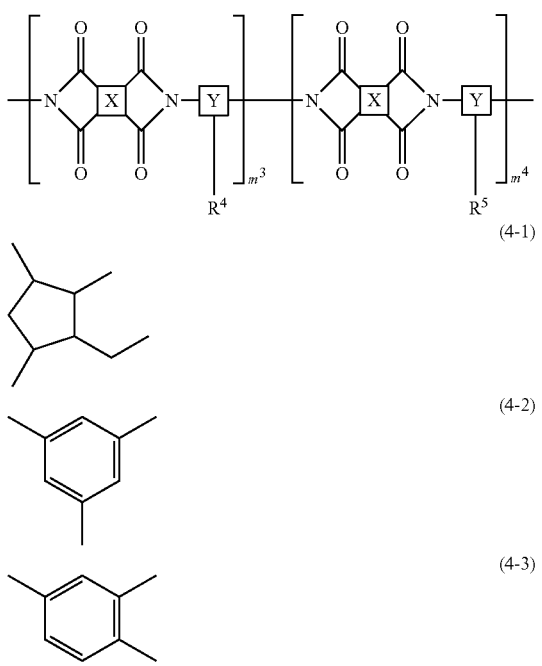

(4-1)

(4-2)

(4-3)

(wherein X represents chemical formula (4-1);
Y represents chemical formula (4-2) or chemical formula (4-3);
m³ and m⁴ represent a natural number;
R⁴ represents a photoreactive functional group, a vertical alignment group, a horizontal alignment group or these combinations; and R⁵ represents the following chemical formula (5).)

[Chem. 35]

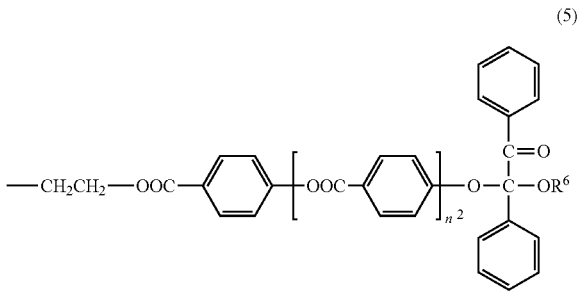

(5)

(wherein n² is any of integers of 0 to 3;
R⁶ represents —H group or saturated aliphatic hydrocarbon group which is less than 4 C or unsaturated aliphatic hydrocarbon group.)

An example of the aforementioned radical polymerizable monomers 4 includes the compound represented by the following chemical formula (6).

[Chem. 36]

$$P^1\text{-}Sp^1\text{-}R^8\text{-}A^1\text{-}(Z\text{-}A^2)_{n^3}\text{-}R^7 \quad (6)$$

(in the formula, R⁷ represents a —R⁸-Sp¹-P¹ group, a hydrogen atom, a halogen atom, a —CN group, an —NO₂ group, an —NCO group, an —NCS group, an —OCN group, an —SCN group, an —SF₅ group, or a C1 to C18 linear or branched alkyl group;
P¹ represents a radical polymerizable group;
Sp¹ represents a C1 to C6 linear, branched, or cyclic alkylene or alkyleneoxy group, or a direct bond;
a hydrogen atom in R⁷ may be substituted with a fluorine atom or a chlorine atom;
a —CH₂— group in R⁷ may be substituted with an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, or an —OCO—CH=CH— group as long as an oxygen atom and a sulfur atom are not adjacent to each other;
R⁸ represents an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, an —OCO—CH=CH— group, or a direct bond;
A¹ and A² are the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group; —CH₂— groups in A¹ and A² each may be substituted with an —O— group or an —S— group as long as these groups are not adjacent to each other;
hydrogen atoms in A¹ and A² each may be substituted with a fluorine atom, a chlorine atom, a —CN group, or a C1 to C6 alkyl, alkoxy, alkylcarbonyl, alkoxycarbonyl, or alkylcarbonyloxy group;
Z represents an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond; and n$^3$ is 0, 1, or 2.)

More specific examples of the aforementioned radical polymerizable monomers 4 includes the compounds represented by the following chemical formulas (7-1) to (7-5).

[Chem. 37]

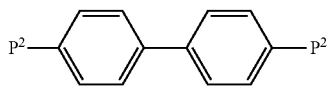 (7-1)

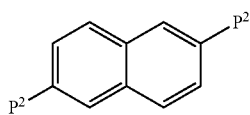 (7-2)

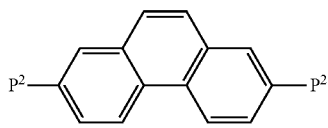 (7-3)

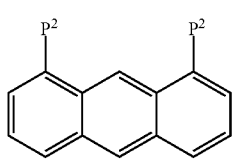 (7-4)

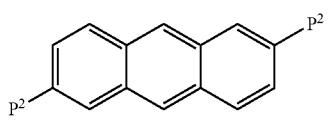 (7-5)

(in the formula, P$^2$ represents a radical polymerizable group.)

Examples of a radical polymerizable group including the compounds represented by the aforementioned chemical formulas (6) and (7-1) to (7-5) include an acrylate group, a methacrylate group, an acrylamide group, a methacrylamide group, a vinyl group, or a vinyloxy group.

In the liquid crystal display device according to Embodiment 1, the array substrate 10, the liquid crystal layer 30, and the color filter substrate 20 are subsequently laminated in a direction from the back surface side of the liquid crystal display device to the viewer-side. A polarizing plate is provided in the back surface side of the array substrate 10 and the viewer-side of the color filter substrate 20. A retardation plate may be further provided to these polarizing plates, and the aforementioned polarizing plate may be a circularly polarizing plate.

A liquid crystal material having a property to be aligned in a specific direction by applying a certain voltage is filled in the liquid crystal layer 30. The alignment property of the liquid crystal molecules in the liquid crystal layer 30 is controlled by applying a voltage which is greater than a threshold value. The liquid crystal material may have positive dielectric anisotropy or may have a negative dielectric anisotropy.

A type of a monomer component in the liquid crystal display device according to Embodiment 1 can be determined by disassembling the liquid crystal display device (e.g., mobile phones, monitors, liquid crystal TVs (television), information displays), performing chemical analysis by using NMR (Nuclear Magnetic Resonance), FT-IR (Fourier Transform Infrared Spectroscopy), MS (Mass Spectrometry), or the like, and analyzing the monomer component in the polymer layer.

(Evaluation Test 1)

In Evaluation Test 1, an alignment film is formed by using the vertical alignment group including the photoreactive functional group and the polymer for alignment films having a structure which has the self-cleavage type polymerization initiation function.

A synthesis method of the compound represented by the following chemical formula (14) will be described as an example of a benzyl ketal diamine compound (synthesis of a benzyl ketal diamine compound).

[Chem. 38]

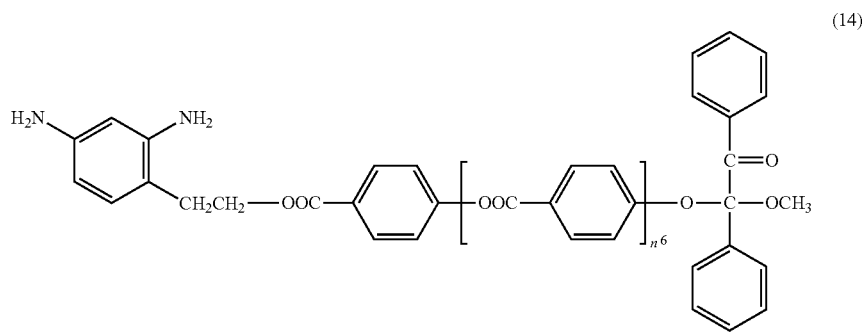

(14)

Initially, as shown in the following chemical formula (15), 5 mL of a benzene solution including 0.64 g (2.5 mmol) of benzyl dimethyl ketal (Compound B) was added into 20 mL of a benzene solution including 0.42 g (2.5 mmol) of ethyl 4-hydroxybenzoate (Compound A) and 0.5 g (5 mmol) of triethylamine at room temperature and nitrogen atmosphere. After that, it was reacted at room temperature for two hours. After the reaction, impurities were extracted by water, and a toluene/ethyl acetate solution (4/1) was purified by column chromatography as a developing solvent, and 0.878 g of Compound C was obtained. The yield was 90%. An average molecular weight of Compound A was 165. An average molecular weight of Compound B was 256. An average molecular weight of Compound C was 390.

[Chem. 39]

(15)

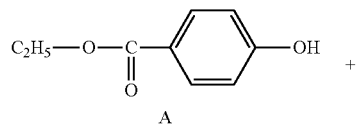

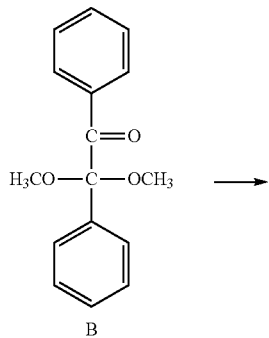

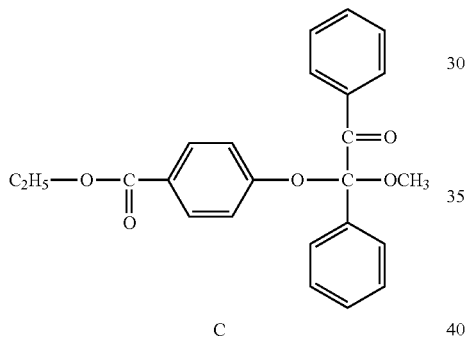

Next, as shown in the following chemical formula (16), aqueous sodium hydroxide was added into 20 mL of a tetrahydrofuran (THF)/methanol mixed solution including 0.78 g (2 mmol) of Compound C, and after that, hydrochloric acid was added, and by agitating the resultant for one hour, 0.69 g (1.9 mmol) of Compound D was obtained. An average molecular weight of Compound D was 362.

[Chem. 40]

(16)

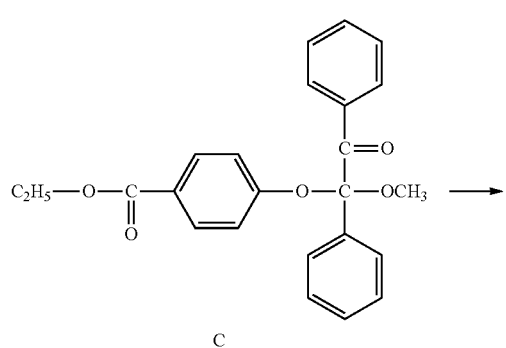

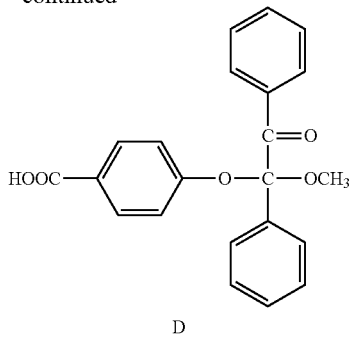

D

After that, as shown in the following chemical formula (17), by repeating the reaction processes shown in the aforementioned chemical reaction formulas (15) and (16), Compound E was synthesized from Compound D. $n^6$ of Compound E is any of integers of 0 to 3.

[Chem. 41]

(17)

Next, as shown in the following chemical reaction formula (18), 3 g of dinitrophenyl acetate (Compound F) was dissolved in 20 mL of THF, and 7 mL of a 1.9 mol/L borane dimethyl sulfide/toluene solution was added. The resultant was left overnight and the reaction was terminated by adding 10 mL of 50% aqueous methanol. After that, the resultant was extracted by using 10 mL of chloroform and was washed away by using 5% aqueous sodium bicarbonate and water and was concentrated until the completion of the extraction to the organic layer. The obtained solution was dissolved in 20 mL of chloroform and was purified by alumina column chromatography. The distillate was concentrated, and a toluene/n-heptane solution (6/4) was added to the concentrate, and the components extracted by heating at 70° were divided. By performing decantation to and cooling down the upper layer component, 1.2 g of 2,4-dinitrophenylethanol (Compound G) is obtained. The yield was 42.7%. 0.4 g of Compound G was dissolved in 8 mL of SOLMIX AP-I (manufactured by Nippon alcohol sales, Inc.), and 0.06 g of Raney Ni was added, and the system was replaced with hydrogen, and the resultant was left overnight under a pressure of 0.4 MPa. The termination of the reaction was confirmed by HPLC, and the reaction solution was filtered through Celite (registered trademark), and the filtrate was concentrated until the completion of the distillate. The obtained crude liquid was distilled under reduced pressure, and 0.69 g of 2,4-diaminophenylethanol (Compound H) was obtained. The yield was 80%. 0.6 g of Compound H was dissolved in 5 mL of acetone, and the solution in which 1.8 g of t-butoxycarbonyl anhydride was dissolved in THF was added. After the addition, the temperature was increased to the reflux temperature and the resultant was left overnight. After the completion of the reaction, the reaction solution was concentrated and dried, and 0.13 g of Compound I was obtained. The yield was 94%. An average molecular weight of Compound I was 342.

[Chem. 42]

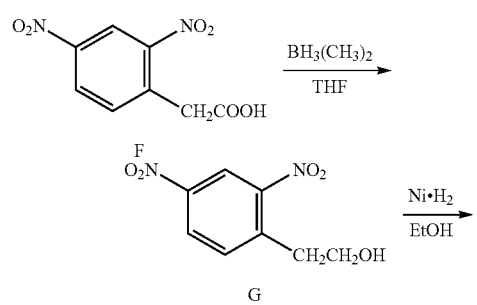

[Chem. 43]

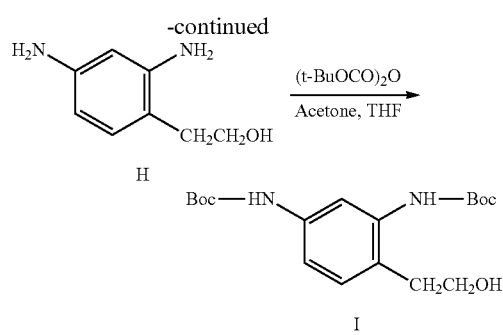

As shown in the following chemical reaction formula (19), by reacting Compound I and Compound E in the same method as the method shown in the aforementioned chemical reaction formula (15), Compound J was synthesized. Compound J was dissolved in methylene chloride, and trifluoromethanesulfonic acid tin (II)($Sn(OTf)_2$) was added serially at a temperature of 0° C. After the resultant was subjected to reaction at room temperature, a 5% $NaHCO_3$ aqueous solution was added to the resultant so as to neutralize the resultant. After that, the resultant was washed with water until it became neutral. An organic layer of the resultant was dried with anhydrous magnesium sulfate, and separated through filtering by use of Celite. A filtrate was concentrated, so that Compound K represented by the following chemical formula (14) was obtained.

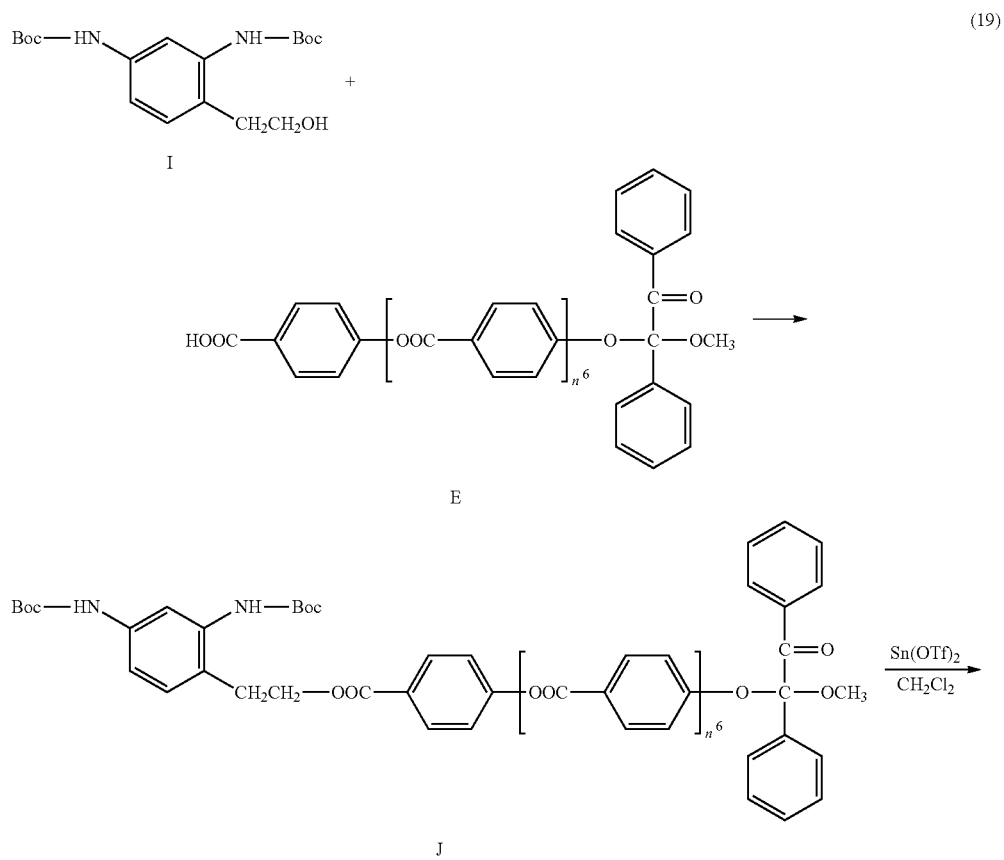

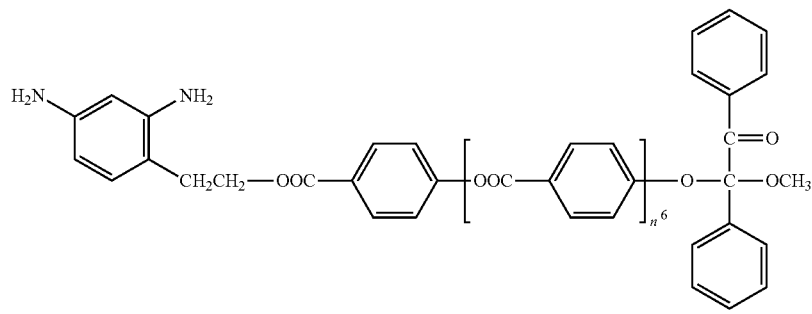

K

Four kinds of polymers for alignment films in which the introduction amounts of the obtained Compound K represented by chemical formula (14) (synthesis of polymer for alignment films) are respectively 0, 10, 20, 30 mol % of the total amount are synthesized. An example of synthesis in a case that the introduction amount of Compound K represented by the following chemical formula (14) is 10 mol % of the total amount is shown.

0.10 mol of acid anhydride represented by the following chemical formula (13) is added in a γ-butyrolactone solution including 0.01 mol of the compound represented by the following chemical formula (14) and 0.09 mol of the compound represented by the following chemical formula (20), and the resultant was reacted for 12 hours at 60° C., so that a polyamic acid with a random structure was obtained.

[Chem. 44]

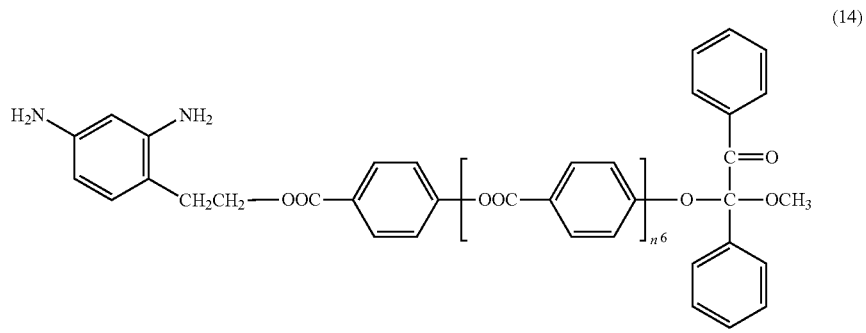

(14)

(wherein $n^6$ is any of integers of 0 to 3.)

The compound represented by the aforementioned chemical formula (14) is a benzyl ketal diamine compound including a functional group having the self-cleavage type polymerization initiation function.

[Chem. 45]

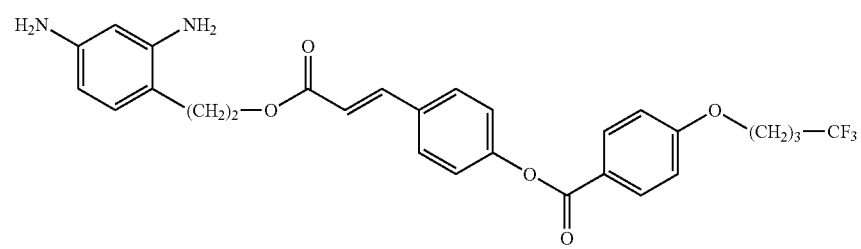

(20)

The compound represented by the aforementioned chemical formula (20) shows a vertical alignment property and is a diamine compound including a cinnamate group as a photoreactive functional group.

[Chem. 46]

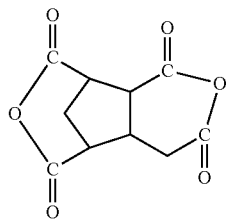

(13)

0.5 mol of excited pyridine and 0.3 mol of acetic acid anhydride were added in the obtained γ-butyrolactone solution of a polyamic acid with a random structure, and the resultant was reacted for 3 hours at 150° C. so as to be imidized, and polymer for alignment films represented by the following chemical formula (21) was obtained. The weight-average molecular weight of the obtained polymer for alignment films was 30,000, and the molecular weight distribution was approximately 2.5, and the imidization ratio was greater than 80%.

of substrates (made of liquid crystal cell), and a pre-baking was performed for 5 minutes at 80° C., and subsequently, a post-baking is performed for 60 minutes at 200° C., so that the vertical alignment film was formed. Next, linear polarized light was irradiated from an oblique direction to the substrate surface and the alignment process was performed. After that, a seal was applied to a one-side substrate, and after spreading beads to the opposite substrate, these substrates were bonded together. After that, the liquid crystal material having negative dielectric anisotropy and the liquid crystal cell including radical polymerizable monomers were filled between the aforementioned substrates, and the following liquid crystal cells of Comparison Examples 1 and 2 and Examples 1 to 6 were made.

Alignment films were formed by using the polymer for alignment films represented by the aforementioned chemical formula (21) in which the introduction amounts of the compound represented by the aforementioned chemical formula (14) in Comparison Example 1 and Examples 1 to 6 are respectively 0, 10, 20, 30 mol % of the total amount, and a phenanthrene compound represented by the following chemical formula (22) was added in the liquid crystal composition as a radical polymerizable monomer to become 0.6 wt % with respect to the total amount of the liquid crystal composition, respectively.

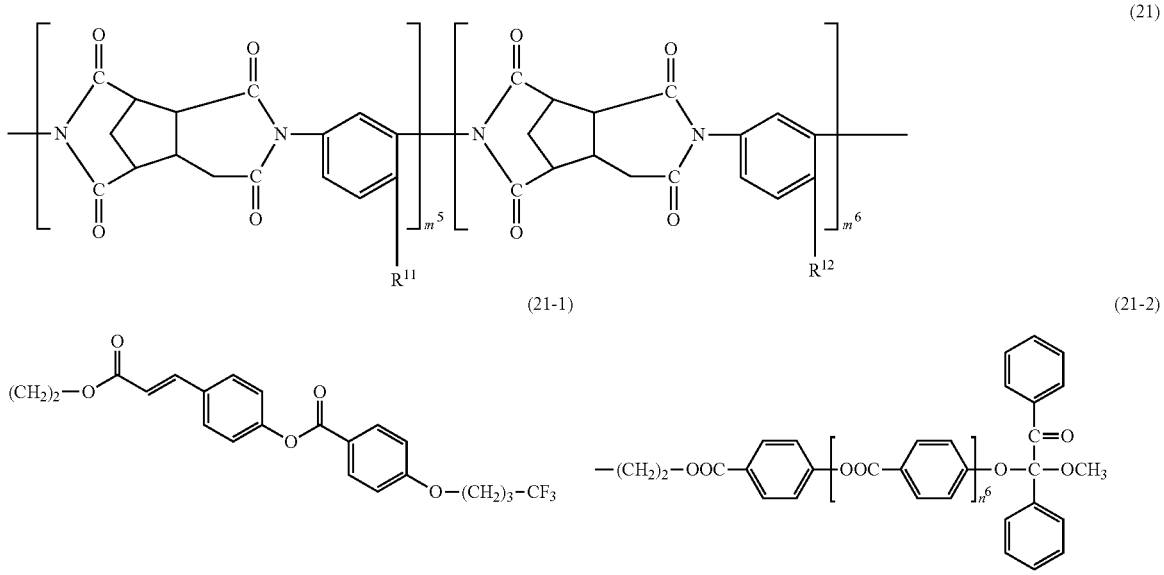

(wherein $m^5$ and $m^6$ are a natural number;
$R^{11}$ represents chemical formula (21-1);
$R^{12}$ represents chemical formula (21-2); and
$n^6$ is any of integers of 0 to 3.)

The side chain of the polymer for alignment films represented by the aforementioned chemical formula (21) has a structure having the self-cleavage type polymerization initiation function and a polyamic acid including a vertical alignment group including a cinnamate group as a photoreactive functional group.

The polymer for alignment films represented by the aforementioned chemical formula (21) was applied on a pair

[Chem. 48]

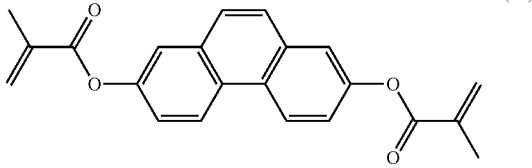

(22)

Alignment films were formed by using the polymer for alignment films represented by the aforementioned chemical formula (21) in which the introduction amounts of the compound represented by the aforementioned chemical formula (14) in Comparison Example 2 and Examples 4 to 6 are respectively 0, 10, 20, 30 mol % of the total amount, and a biphenyl-based compound represented by the following chemical formula (23) was added in the liquid crystal composition as a radical polymerizable monomer to become 0.3 wt % with respect to the total amount of the liquid crystal composition, respectively.

[Chem. 49]

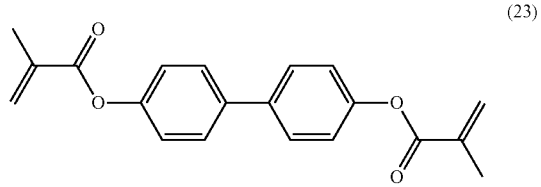

(23)

After heating each of the liquid crystal cells at 130° C., rapid cooling was performed, and the polymerization of radical polymerizable monomers was performed by irradiating ultraviolet ray of wavelength 365 nm for 30 minutes by using black-light (FHF-32BLB made by Toshiba Lighting and Technology Co., Ltd.). At this time, the wavelength, which is less than 330 nm, was cut by using a cut filter. Further, the polymerization reaction was performed without applying voltage. After that, a polarizing plate was bonded to the outside of the liquid crystal cells, so that the liquid crystal cells were completed.

Aging testing was performed to each of the completed liquid crystal cells, and after the aging testing, the values of VHR (voltage holding ratio), r-DC (residual DC voltage), Δ tilt (tilt angle variations) and residual monomer ratio in the liquid crystal layer were measured.

In the aging testing, a voltage of 10V was applied to each of the liquid crystal cells for 100 hours at 30 Hz. The value of VHR was measured by using 6254-inch LCD physical properties measurement system made by Toyo Corp. The liquid crystal cells were placed in an oven at 70° C., and after applying a pulse voltage, the electric potential between the electrodes for an open period (a period of no applied voltage) of 16.61 ms was measured. The value of r-DC was measured with a DC offset voltage of 2V by a flicker elimination method. For Δ tilt, the pretilt angle after beginning period and aging was measured by a crystal rotation method by using OMS-5, and the change amount in tilt angle was determined. For the residual monomer ratio, the amount of monomers in the liquid crystal layer before and after the polarization was measured by liquid chromatography, and the ratio of residual monomers in the liquid crystal layer after the polarization was determined.

The results of the values of VHR, r-DC, Δ tilt, and residual monomer ratio of Evaluation Test 1 are shown in the following Tables 1 and 2. Table 1 shows a case in which the compound represented by the aforementioned chemical formula (22) was used as a radical polymerizable monomer, and Table 2 shows a case in which the compound represented by the aforementioned chemical formula (23) was used as a radical polymerizable monomer.

TABLE 1

|  | Comparison Example 1 | Example 1 | Example 2 | Example 3 |
|---|---|---|---|---|
| Introduction amount of chemical formula (14) (mol %) | 0 | 10 | 20 | 30 |
| VHR (%) | 99.2 | 99.4 | 99.4 | 99.4 |
| r-DC (mV) | 30 | 0 | 0 | 0 |
| Δ tilt (°) | 0.11 | 0.05 | 0.04 | 0.04 |
| Ratio of residual monomers (%) | 5 to 10 | less than 0.1 | less than 0.1 | less than 0.1 |

TABLE 2

|  | Comparison Example 2 | Example 4 | Example 5 | Example 6 |
|---|---|---|---|---|
| Introduction amount of chemical formula (14) (mol %) | 0 | 10 | 20 | 30 |
| VHR (%) | 97.1 | 99.1 | 99.1 | 99.1 |
| r-DC (mV) | 250 | 110 | 90 | 70 |
| Δ tilt (°) | 0.18 | 0.06 | 0.04 | 0.03 |
| Ratio of residual monomers (%) | 55 | less than 0.1 | less than 0.1 | less than 0.1 |

As shown in Table 1, when the phenanthrene compound represented by the aforementioned chemical formula (22) was used as a radical polymerizable monomer, the value of VHR was high: more than 99% in all of Examples 1 to 3. In Comparison Example 1, the values of r-DC and Δ tilt were high and the residual monomer ratio in the liquid crystal layer was 5 to 10% as compared with Examples 1 to 3. In Examples 1 to 3, by introducing the compound represented by the aforementioned chemical formula (14) to the polymer for alignment films, it is understood that the values of r-DC, Δ tilt, and the residual monomer ratio in the liquid crystal layer were lowered.

As shown in Table 2, when the biphenyl-based compound represented by the aforementioned chemical formula (23) was used as a radical polymerizable monomer, the value of VHR in Comparison Example 2 was low at 97%, and the value of VHR in Examples 4 to 6 was a high value, at 99%. In Comparison Example 2, the value of r-DC was 250 mV, Δ tilt was 0.18°, residual monomer ratio was 55%; thus, the values were high. On the other hand, in Examples 4 to 6, as the introduction amount of the compound represented by the aforementioned chemical formula (14) added to the polymer for alignment films increased, r-DC became lower and Δ tilt became smaller and the residual monomer ratio was lowered to less than 0.1%.

The aforementioned results will be considered in detail. Initially, since the compound represented by the aforementioned chemical formula (14) was not introduced to the polymers for alignment films in Comparison Examples 1 and 2, the alignment films of the liquid crystal cells in Comparison Examples 1 and 2 did not have side chains including a structure having the polymerization initiation function. Therefore, even when the light was irradiated in a case of forming a PSA layer, the amount of radical generation was low, so that it is considered that the PSA layer was not sufficiently formed. Further, the unreacted radical polymerizable monomers were kept in the liquid crystal layer, so that the residual monomer ratio became high, and as a result, it is considered that the value of VHR was lowered and r-DC was generated. Further, the unreacted radical polymerizable monomers kept in the liquid crystal layer were polymerized by the light from the backlight used in the aging testing, so that it is considered that Δ tilt became large.

In Example 1 to 6, the alignment film included in each of the liquid crystal cells had a side chain including a structure having the polymerization initiation function, so that by the light irradiation in a case of forming the PSA layer, the radicals were generated from the side chains of the alignment films, and the polymerization velocity of the radical polymerizable monomers became fast. Therefore, it is considered that a sufficient PSA layer can be formed, and Δ tilt became smaller. Further, almost all of the radical polymerizable monomers formed the PSA layer, so that it is considered that the ratio of monomers kept in the liquid crystal layer became low. In addition, the side chain including the structure having the polymerization initiation function was bonded with the main chain of the alignment film by covalent bond, so impurities of polymerization initiator origin were not generated in the liquid crystal layer after the radical generation, and the lowering of the value of VHR and the generation of r-DC were suppressed. Further, as the amount of the radical generation increased, the polymerization velocity of the radical polymerizable monomers became faster; therefore, the introduction amount of the compound represented by the aforementioned chemical formula (14) added to the polymer for alignment films increased, and excellent results were obtained.

As the results described above, it is understood that in a case that the alignment films were formed by using the polymer for alignment films having the vertical alignment group including the photoreactive functional group and including the structure having the self-cleavage type polymerization initiation function, even when the light irradiation time was short, the liquid crystal display device which rarely causes image burn-in was obtained.

(Evaluation Test 2)

Evaluation Test 2 was conducted in the same manner as Evaluation Test 1 except that the polymer for alignment films having a horizontal alignment group including a photoreactive functional group and including a structure having a self-cleavage type polymerization initiation function was used.

(Production of Polymer for Alignment Films)

Four kinds of polymers for alignment films in which the introduction amounts of the compound represented by the aforementioned chemical formula (14) were respectively 0, 10, 20, 30 mol % of the total amount were synthesized. An example of synthesis in a case that the introduction amount of the compound represented by the aforementioned chemical formula (14) is 10 mol % of the total amount is shown below.

0.10 mol of acid anhydride represented by the aforementioned chemical formula (13) was added in a γ-butyrolactone solution including 0.01 mol of the compound represented by the aforementioned chemical formula (14) and 0.09 mol represented by the following chemical formula (24), and the reaction was performed for 12 hours at 60° C., resulting in a polyamic acid with a random structure.

[Chem. 50]

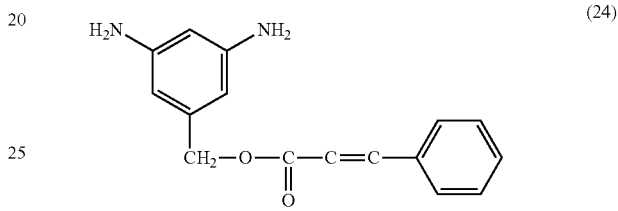

(24)

The compound represented by the aforementioned chemical formula (24) has a horizontal alignment property, and is a diamine compound having a cinnamate group as a photoreactive functional group.

The resultant was imidized in the same manner as Evaluation Test 1, and the polymer for alignment films represented by the following chemical formula (25) was obtained. In the obtained polymer for alignment films, the weight-average molecular weight was 30,000, the molecular weight distribution was approximately 2.5, and the imidization ratio was more than 80%.

[Chem. 51]

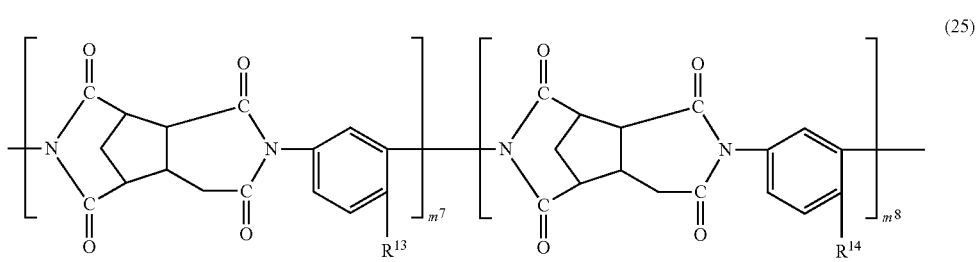

(25)

(25-1)

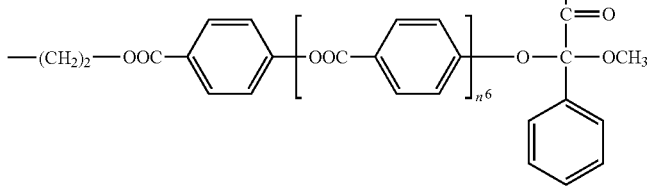

(25-2)

(wherein $m^7$ and $m^8$ are a natural number;
$R^{13}$ represents chemical formula (25-1);
$R^{14}$ represents chemical formula (25-2); and
$n^6$ is any of integers of 0 to 3.)

The polymer for alignment films represented by the aforementioned chemical formula (25) is a polyamic acid including a structure having a self-cleavage type polymerization initiation function and having a horizontal alignment group including a cinnamate group as a photoreactive functional group in the side chains.

(Production of Liquid Crystal Cells)

The polymer for alignment films represented by the aforementioned chemical formula (25) was applied to a pair of substrates, and the resultant was calcined in the same manner as Evaluation Test 1, and the horizontal alignment films were formed. Next, linear polarized light was radiated from an oblique direction and the alignment process was performed. After that, the substrates were bonded together in the same manner as Evaluation Test 1, and the liquid crystal composition including the liquid crystal material showing positive dielectric anisotropy and radical polymerizable monomers was filled, and the following liquid crystal cells in Comparison Examples 3 and 4 and Examples 7 to 12 were produced.

In Comparison Example 3 and Examples 7 to 9, the alignment films were formed by using the polymer for alignment films represented by the aforementioned chemical formula (25) in which the introduction amounts of the compound represented by the aforementioned chemical formula (14) were respectively 0, 10, 20, 30 mol % of the total amount, and the phenanthrene compound represented by the aforementioned chemical formula (22) was added as a radical polymerizable monomer to become 0.6 wt % with respect to the total amount of the liquid crystal composition, respectively.

In Comparison Example 4 and Examples 10 to 12, the alignment films were formed by using polymer for alignment films represented by the aforementioned chemical formula (25) in which the introduction amounts of the compound represented by the aforementioned chemical formula (14) were respectively 0, 10, 20, 30 mol % of the total amount, and a biphenyl-based compound represented by the aforementioned chemical formula (23) was added as a radical polymerizable monomer to become 0.3 wt % with respect to the total amount of the liquid crystal composition, respectively.

For each of the liquid crystal cells, the polymerization of the radical polymerizable monomers was performed in the same manner as Evaluation Test 1. In Evaluation Test 2, the polymerization reaction was performed without applying voltage. After that, the polarizing plate was bonded to the outside of the liquid crystal cells, so that the liquid crystal cells were completed.

The aging testing was performed to each of the completed liquid crystal cells, and after the aging testing, the values of VHR (voltage holding ratio), r-DC (residual DC voltage), and residual monomer ration in liquid crystal layer were measured. The test method of the aging testing and the measurement methods and the measurement conditions of VHR, r-DC and residual monomer ratio were applied in the same manner as Evaluation Test 1.

The following Tables 3 and 4 show the results of VHR, r-DC and residual monomer ratio in Evaluation Test 2. Table 3 shows a case in which the compound represented by the aforementioned chemical formula (22) was used as a radical polymerizable monomer, and Table 4 shows a case in which the compound represented by the aforementioned chemical formula (23) was used as a radical polymerizable monomer.

TABLE 3

| | Comparison Example 3 | Example 7 | Example 8 | Example 9 |
|---|---|---|---|---|
| Introduction amount of chemical formula (14) (mol %) | 0 | 10 | 20 | 30 |
| VHR (%) | 99.2 | 99.4 | 99.4 | 99.4 |
| r-DC (mV) | 30 | 0 | 0 | 0 |
| Ratio of residual monomers (%) | 5 to 10 | less than 0.1 | less than 0.1 | less than 0.1 |

TABLE 4

| | Comparison Example 4 | Example 10 | Example 11 | Example 12 |
|---|---|---|---|---|
| Introduction amount of chemical formula (14) (mol %) | 0 | 10 | 20 | 30 |
| VHR (%) | 97.4 | 99.1 | 99.1 | 99.1 |
| r-DC (mV) | 280 | 90 | 50 | 20 |
| Ratio of residual monomers (%) | 50 | less than 0.1 | less than 0.1 | less than 0.1 |

As shown in Table 3, when the phenanthrene compound represented by the aforementioned chemical formula (22) was used as a radical polymerizable monomer, the value of VHR in all of Comparison Example 3 and Examples 7 to 9 was a high value at more than 99%. In Comparison Example 3, the value of r-DC was higher than Examples 7 to 9, and the residual monomer ratio in the liquid crystal layer was 5 to 10%. According to Examples 7 to 9, it is understood that the values of r-DC and the residual monomer ratio in the liquid crystal layer were lowered by introducing the compound represented by the aforementioned chemical formula (14) to the polymer for alignment films.

As shown in Table 4, when the biphenyl-based compound represented by the aforementioned chemical formula (23) was used as a radical polymerizable monomer, the value of VHR in Comparison Example 4 was low at the 97% level, and the values of VHR in Examples 10 to 12 were high at the 99% level. In Comparison Example 4, the value of r-DC was high at 280 mV, and the value of residual monomer ratio was high at 50%. On the other hand, in Examples 10 to 12, as the introduction amount of the compound represented by the aforementioned chemical formula (14) added to the polymer for alignment films increased, the value of r-DC was lowered and the value of residual monomer ratio was lowered to less than 0.1%.

The aforementioned results will be considered in detail. Initially, since the compound represented by the aforementioned chemical formula (14) was not introduced to the polymer for alignment films in Comparison Examples 3 and 4, the alignment films of the liquid crystal cells in Comparison Examples 3 and 4 do not have side chains including a structure having a polymerization initiation function. Therefore, it is considered that even when the light was irradiated in a case of forming the PSA layer, the amount of radical generation was low, and thus the PSA layer was not formed sufficiently. Further, the unreacted radical polymerizable monomers remained in the liquid crystal layer, so the value of residual monomer ratio became high, and as a result, the value of VHR was lowered, and r-DC was generated.

In Examples 7 to 12, since the alignment films included in the liquid crystal cells had side chains including a structure having the polymerization initiation function, the radicals were generated by the light irradiation in a case of forming the PSA layer, and the polymerization velocity of the radical polymerizable monomers became fast. Further, since almost all of the radical polymerizable monomers formed the PSA layer, it is considered that the ratio of monomers remaining in the liquid crystal layer was lowered. In addition, since the side chains including the structure having the polymerization initiation function were bonded with the main chain of the alignment films by a covalent bond, impurities of polymerization initiator origin were not generated in the liquid crystal layer after the radical generation, and the lowering of the value of VHR and the generation of r-DC were suppressed. Further, as the amount of the radical generation increased, the polymerization velocity of the radical polymerizable monomers became faster, so as the introduction amount of the compound represented by the aforementioned chemical formula (14) added to the polymer for alignment films increased, excellent results were obtained.

As the results described above, when the polymer for alignment films including a horizontal alignment group including a photoreactive functional group and including the structure having the self-cleavage type polymerization initiation function is formed in the side chains, it is understood that a liquid crystal display device that rarely causes image burn-in is also obtained even when the light irradiation time is short.

(Evaluation Test 3)

Evaluation Test 3 was conducted in the same manner as Evaluation Test 1 except the point in which the polymer for alignment films having a vertical alignment group, which does not include a photoreactive functional group, and including a structure having the self-cleavage type polymerization initiation function was used.

(Production of Polymer for Alignment Films)

Four kinds of polymers for alignment films in which the introduction amounts of the compound represented by the aforementioned chemical formula (14) were respectively 0, 10, 20, 30 mol % of the total amount were synthesized. An example of synthesis in which the introduction amount of the compound represented by the aforementioned chemical formula (14) is 10 mol % of the total amount is shown below.

0.10 mol of acid anhydride represented by the aforementioned chemical formula (13) was added in a γ-butyrolactone solution including 0.01 mol of the compound represented by the aforementioned chemical formula (14) and 0.09 mol of the compound represented by the following chemical formula (26), and the resultant was reacted for 12 hours at 60° C., so that a polyamic acid with a random structure was obtained.

[Chem. 52]

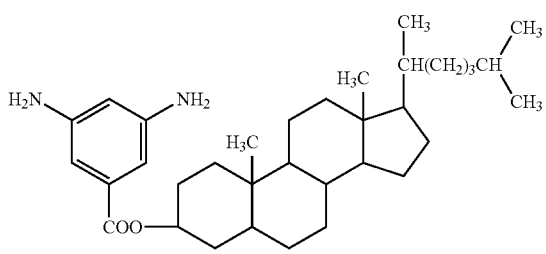

(26)

The compound represented by the aforementioned chemical formula (26) is a diamine compound having a polycyclic hydrocarbon group showing a vertical alignment property.

The resultant was imidized in the same manner as Evaluation Test 1, and the polymer for alignment films represented by the following chemical formula (27) was obtained. In the obtained polymer for alignment films, the weight-average molecular weight was 30,000, the molecular weight distribution was approximately 2.5, and the imidization ratio was more than 80%.

[Chem. 53]

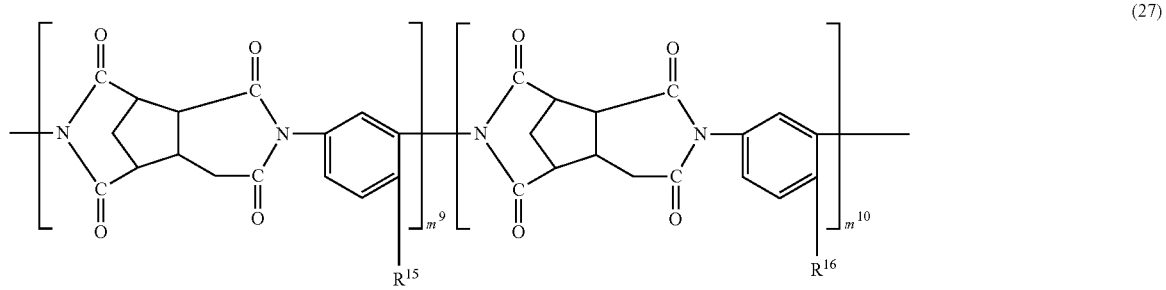

(27)

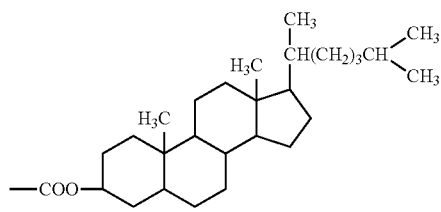

(27-1)

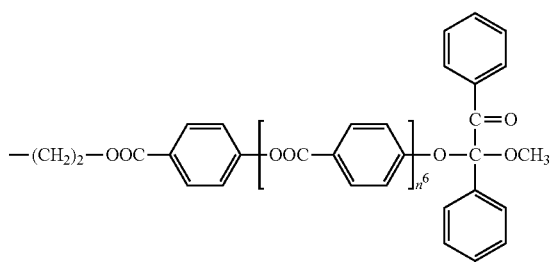

(27-2)

(wherein $m^9$ and $m^{10}$ are a natural number;
$R^{15}$ represents chemical formula (27-1);
$R^{16}$ represents chemical formula (27-2); and
$n^6$ is any of integers of 0 to 3.)

The polymer for alignment films represented by the aforementioned chemical formula (27) is a polyamic acid including a structure having a self-cleavage type polymerization initiation function and having a vertical alignment group including a polycyclic hydrocarbon group in the side chains.

(Production of Liquid Crystal Cells)

The polymer for alignment films represented by the aforementioned chemical formula (27) was applied to a pair of substrates, and the resultant was calcined in the same manner as Evaluation Test 1, and the vertical alignment films were formed. The alignment process was not performed in Evaluation Test 3. After that, the substrates were bonded together in the same manner as Evaluation Test 1, and the liquid crystal composition including the liquid crystal material showing negative dielectric anisotropy and radical polymerizable monomers was filled, and the following liquid crystal cells of Comparison Examples 5 and 6 and Examples 13 to 18 were produced.

In Comparison Example 5 and Examples 13 to 15, the alignment films were formed by using the polymer for alignment films represented by the aforementioned chemical formula (27) in which the introduction amounts of the compound represented by the aforementioned chemical formula (14) were respectively 0, 10, 20, 30 mol % of the total amount, and the phenanthrene compound represented by the aforementioned chemical formula (22) was added as a radical polymerizable monomer to become 0.6 wt % with respect to the total amount of the liquid crystal composition, respectively.

In Comparison Example 6 and Examples 16 to 18, the alignment films were formed by using the polymer for alignment films represented by the aforementioned chemical formula (27) in which the introduction amounts of the compound represented by the aforementioned chemical formula (14) were respectively 0, 10, 20, 30 mol % of the total amount, and a biphenyl-based compound represented by the aforementioned chemical formula (23) was added as a radical polymerizable monomer to become 0.3 wt % with respect to the total amount of the liquid crystal composition, respectively.

For each of the liquid crystal cells, the polymerization of the radical polymerizable monomers was performed in the same manner as Evaluation Test 1. In Evaluation Test 3, the polymerization reaction was performed by applying the voltage of 10V to the liquid crystal cells. After that, the polarizing plate was bonded to the outside of the liquid crystal cells, so that the liquid crystal cells were completed.

The aging testing was performed to each of the completed liquid crystal cells, and after the aging testing, the values of VHR (voltage holding ratio), r-DC (residual DC voltage), and residual monomer ration in the liquid crystal layer were measured. The test method of the aging testing and the measurement methods and the measurement conditions of VHR, r-DC and residual monomer ratio were applied in the same manner as Evaluation Test 1.

The following Tables 5 and 6 show the results of VHR, r-DC and residual monomer ratio of Evaluation Test 3. Table 5 shows a case in which the compound represented by the aforementioned chemical formula (22) was used as a radical polymerizable monomer, and Table 6 shows a case in which the compound represented by the aforementioned chemical formula (23) was used as a radical polymerizable monomer.

TABLE 5

|  | Comparison Example 5 | Example 13 | Example 14 | Example 15 |
|---|---|---|---|---|
| Introduction amount of chemical formula (14) (mol %) | 0 | 10 | 20 | 30 |
| VHR (%) | 99.3 | 99.5 | 99.5 | 99.5 |
| r-DC (mV) | 30 | 0 | 0 | 0 |
| Ratio of residual monomers (%) | 5 to 10 | less than 0.1 | less than 0.1 | less than 0.1 |

TABLE 6

|  | Comparison Example 6 | Example 16 | Example 17 | Example 18 |
|---|---|---|---|---|
| Introduction amount of chemical formula (14) (mol %) | 0 | 10 | 20 | 30 |
| VHR (%) | 97.5 | 99.4 | 99.5 | 99.5 |
| r-DC (mV) | 210 | 80 | 30 | 20 |
| Ratio of residual monomers (%) | 55 | less than 0.1 | less than 0.1 | less than 0.1 |

As shown in Table 5, when the phenanthrene compound represented by the aforementioned chemical formula (22) was used as a radical polymerizable monomer, the value of VHR in all of Comparison Example 5 and Examples 13 to 15 was high value at more than 99%. In Comparison Example 5, the value of r-DC was higher than the values in Examples 13 to 15, and the residual monomer ratio in the liquid crystal layer was 5 to 10%. According to Examples 13 to 15, it is understood that the values of r-DC and the residual monomer ratio in the liquid crystal layer were lowered by introducing the compound represented by the aforementioned chemical formula (14) to the polymer for alignment films.

As shown in Table 6, when the biphenyl-based compound represented by the aforementioned chemical formula (23) was used as a radical polymerizable monomer, the value of VHR in Comparison Example 6 was low at the 97% level, and the values of VHR in Examples 16 to 18 were high at the 99% level. In Comparison Example 6, the value of r-DC was high at 210 mV, and the value of residual monomer ratio was high at 55%. On the other hand, in Examples 16 to 18, as the introduction amount of the compound represented by the aforementioned chemical formula (14) added to the polymer for alignment films increased, the value of r-DC was lowered and the value of residual monomer ratio was lowered to less than 0.1%.

The aforementioned results will be considered in detail. Initially, since the compound represented by the aforementioned chemical formula (14) was not introduced to the polymer for alignment films in Comparison Examples 5 and 6, the alignment films of the liquid crystal cells in Comparison Examples 5 and 6 do not have side chains including the structure having the polymerization initiation function. Therefore, it is considered that even when the light was radiated in a case of forming the PSA layer, the amount of radical generation was low, so the PSA layer was not formed sufficiently. Further, the unreacted radical polymerizable monomers were remained in the liquid crystal layer, so that the value of residual monomer ratio became high, and as a result, the value of VHR was lowered, and r-DC was generated.

In Examples 13 to 18, since the alignment films included in the liquid crystal cells had side chains including the structure having the polymerization initiation function, the radicals were generated by the light irradiation in a case of forming the PSA layer, and the polymerization velocity of the radical polymerizable monomers became fast. Further, since almost all of the radical polymerizable monomers formed the PSA layer, the ratio of monomers remaining in the liquid crystal layer was lowered. In addition, since the side chains including the structure having the polymerization initiation function were covalently bonded with the main chain of the alignment films, impurities of polymerization initiator origin were not generated in the liquid crystal layer after the radical generation, and the lowering of the value of VHR and the generation of r-DC were suppressed. Further, as the amount of the radical generation increased, the polymerization velocity of the radical polymerizable monomers became faster, so the introduction amount of the compound represented by the aforementioned chemical formula (14) added to the polymer for alignment films increased, and excellent results were obtained.

As the results described above, when the polymer for alignment films including the vertical alignment group including the photoreactive functional group and including the structure having the self-cleavage type polymerization initiation function is formed in the side chains, it is understood that a liquid crystal display device that rarely causes image burn-in is also obtained even when the light irradiation time is short.

(Evaluation Test 4)

Evaluation Test 4 was conducted in the same manner as Evaluation Test 1 except that the alignment films were formed by using the polymer for alignment films having a vertical alignment group, which does not include a photoreactive functional group, and having a vertical alignment group including a photoreactive functional group, and polymerization initiator monomers were added to the liquid crystal composition.

(Production of Polymer for Alignment Films)

0.10 mol of acid anhydride represented by the aforementioned chemical formula (13) was added in a γ-butyrolactone solution including 0.09 mol of the compound represented by the aforementioned chemical formula (20) and 0.01 mol of the compound represented by the aforementioned chemical formula (26), and the resultant was reacted for 12 hours at 60° C., so that a polyamic acid with a random structure was obtained.

The resultant was imidized in the same manner as Evaluation Test 1, and a polymer for alignment films represented by the following chemical formula (28) was obtained. In the obtained polymer for alignment films, the weight-average molecular weight was 30,000, the molecular weight distribution was approximately 2.5, and the imidization ratio was more than 80%.

[Chem. 54]

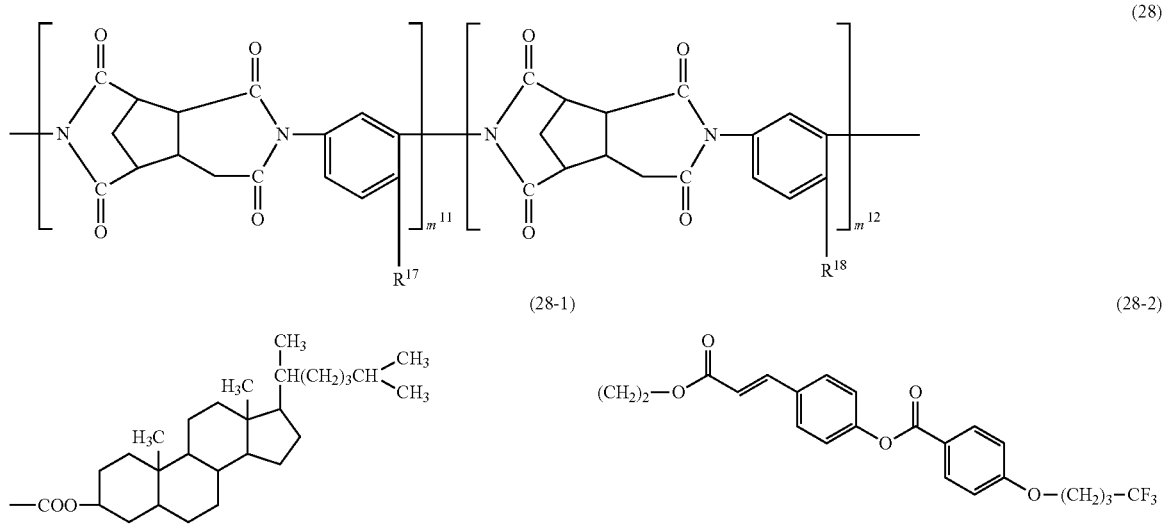

(wherein $m^{11}$ and $m^{12}$ are a natural number;
$R^{17}$ represents chemical formula (28-1); and
$R^{18}$ represents chemical formula (28-2).)

The polymer for alignment films represented by the aforementioned chemical formula (28) is a vertical alignment polyamic acid having a vertical alignment group including a polycyclic hydrocarbon group and having a cinnamate group as a photoreactive functional group.

(Production of Liquid Crystal Cells)

The polymer for alignment films represented by the aforementioned chemical formula (28) was applied to a pair of substrates, and the resultant was calcined in the same manner as Evaluation Test 1, and the vertical alignment films were formed. Next, linear polarized light was radiated from an oblique direction and the alignment process was performed. After that, the substrates were bonded together in the same manner as Evaluation Test 1, and the liquid crystal composition including the liquid crystal material showing negative dielectric anisotropy and radical polymerizable monomers and polymerization initiator monomers was filled, and the following liquid crystal cells of Comparison Examples 7 to 9 were produced.

In Comparison Examples 7 to 9, the biphenyl-based compound represented by the aforementioned chemical formula (23) was added in the liquid crystal composition as a radical polymerizable monomer to become 0.30 wt % with respect to the total amount of the liquid crystal composition, respectively. The compound represented by the following chemical formula (29) was added as a polymerization initiator monomer to become 0, 0.15, 0.30 wt % with respect to the total amount of the liquid crystal composition, respectively.

[Chem. 55]

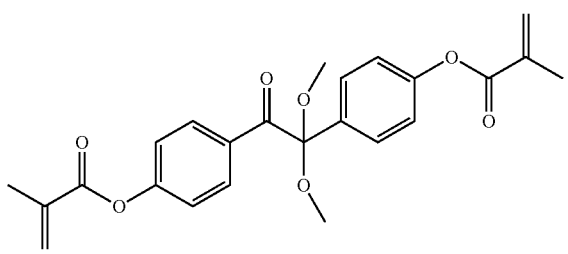

(29)

For each of the liquid crystal cells, the polymerization of the radical polymerizable monomers was performed in the same manner as Evaluation Test 1. In Evaluation Test 4, the polymerization reaction was performed without applying voltage. After that, the polarizing plate was bonded to the outside of the liquid crystal cells to complete the liquid crystal cells.

The aging testing was performed on each of the completed liquid crystal cells, and after the aging testing, the values of VHR (voltage holding ratio) and r-DC (residual DC voltage) were measured. The test method of the aging testing and the measurement methods and the measurement conditions of VHR and r-DC were applied in the same manner as Evaluation Test 1.

The results of VHR and r-DC of Evaluation Test 4 are shown in Table 7 below.

TABLE 7

|  | Comparison Example 7 | Comparison Example 8 | Comparison Example 9 |
|---|---|---|---|
| Additive amount of initiator monomers (wt %) | 0 | 0.15 | 0.3 |
| Additive amount of monomers for PSA (wt %) | 0.3 | 0.3 | 0.3 |
| VHR (%) | 97.1 | 97.4 | 94.5 |
| r-DC (mV) | 250 | 80 | 190 |

As shown in Table 7, the values of VHR in Comparison Examples 7 and 8 were at the 97% level, and the value of VHR in Comparison Example 9 was at the 94% level. Further, the value of r-DC in Comparison Example 7 was 250 mV, but the value of r-DC in Comparison Example 8 in which polymerization initiator was added was lowered to 80 mV. However, the value of r-DC in Comparison Example 9 in which the polymerization initiator was further added was increased again to 190 mV.

The aforementioned results will be considered in detail. Initially, the polymerization velocity of the radical polymerizable monomers becomes faster when the polymerization initiator monomers are added, so that the PSA layer is easily formed. Therefore, it is considered that the entering of the impurities, which were generated due to the deterioration of the alignment films, etc. by the PSA layer, to the liquid crystal layer can be prevented in Comparison Example 8 as compared with Comparison Example 7. Thus, it is considered that the value of VHR was slightly increased and the value of r-DC was significantly lowered in Comparison Example 8 as compared with Comparison Example 7. However, it is considered that when the polymerization initiator monomers were further added in Comparison Example 9, by keeping large amounts of radicals in the liquid crystal layer, the value of VHR was lowered again and the value of r-DC was increased.

The aforementioned results are summarized as follows: when the value of VHR is less than 98%, this causes image burn-in. In Comparison Examples 7 to 9, the values of VHR were less than 98% and further and the values of r-DC were high; therefore, it is considered that image burn-in is caused in all of Comparison Examples 7 to 9.

(Evaluation Test 5)

Evaluation Test 5 was conducted in the same manner as Evaluation Test 1 except that the alignment films were formed by using the polymer for alignment films having a vertical alignment group including a photoreactive functional group and including a structure having a hydrogen-drawing type polymerization initiation function.

(Production of Polymer for Alignment Films)

Four kinds of polymers for alignment films in which the compounds represented by the following chemical formulas (30) and (31) were respectively introduced in 0, 10, 20, 30 mol % of the total amount were synthesized. An example of synthesis in which each of the compounds represented by the following chemical formulas (30) and (31) was introduced in 5 mol % of the total amount is shown.

0.10 mol of acid anhydride represented by the aforementioned chemical formula (13) was added in a γ-butyrolactone solution including 0.005 mol of the compound represented by the following chemical formula (30), 0.005 mol of the compound represented by the following chemical formula (31), and 0.09 mol of the compound represented by the aforementioned chemical formula (20), and the resultant was reacted for 12 hours at 60° C., so that a polyamic acid with a random structure was obtained.

[Chem. 56]

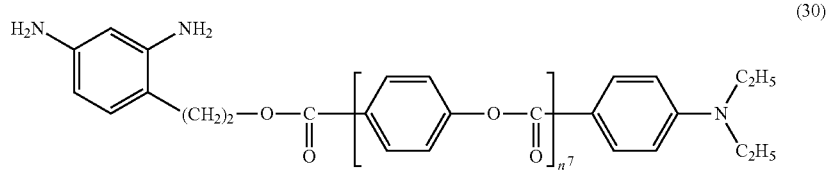

(30)

(wherein $n^7$ is any of integers of 0 to 3.)

[Chem. 57]

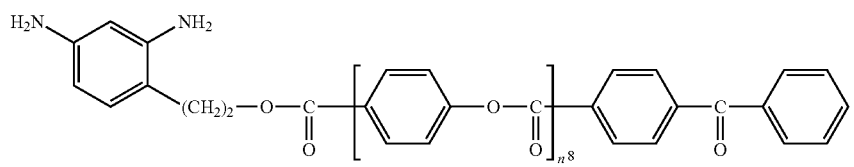

(31)

(wherein $n^8$ is any of integers of 0 to 3.)

The compounds represented by the aforementioned chemical formulas (30) and (31) are a diamine compound having a structure including the hydrogen-drawing type polymerization initiation function.

The resultant was imidized in the same manner as Evaluation Test 1, and a polymer for alignment films represented by the following chemical formula (32) was obtained. In the obtained polymer for alignment films, the weight-average molecular weight was 30,000, the molecular weight distribution was approximately 2.5, and the imidization ratio was more than 80%.

of substrates, and the resultant was calcined in the same manner as Evaluation Test 1, and the vertical alignment films were formed. Next, linear polarized light was radiated from an oblique direction and the alignment process was performed. After that, the substrates were bonded together in the same manner as Evaluation Test 1, and the liquid crystal composition including the liquid crystal material showing negative dielectric anisotropy and radical polymerizable monomers was filled, and the following liquid crystal cells of Comparison Examples 10 and 13 were produced.

In Comparison Examples 10 to 13, the alignment films were formed by using the polymer for alignment films

[Chem. 58]

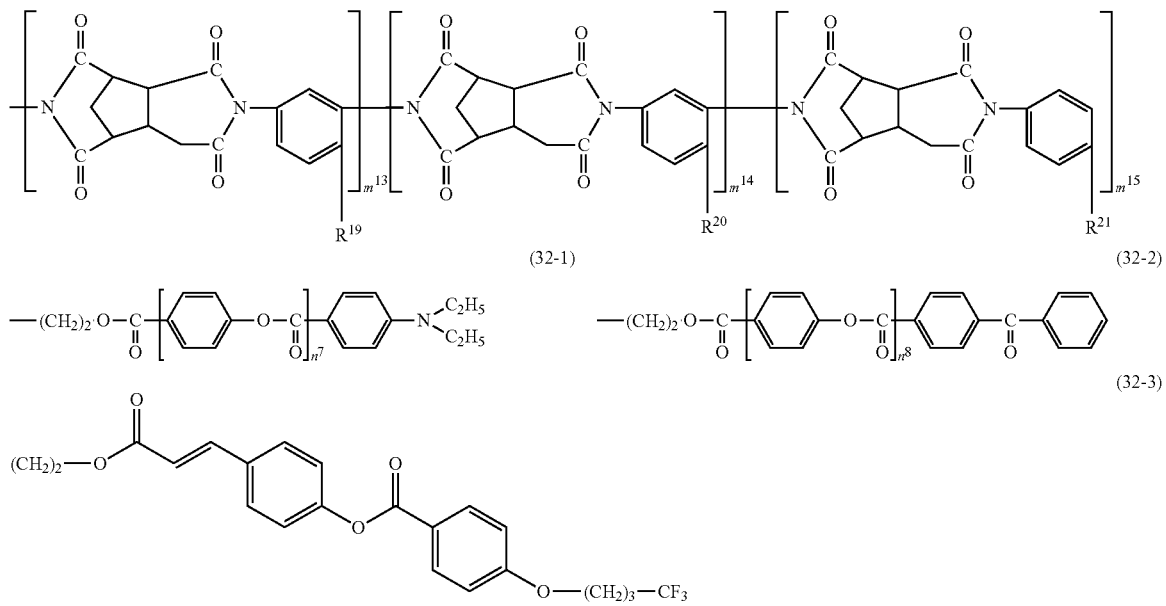

(wherein $m^{13}$, $m^{14}$ and $m^{15}$ are a natural number;
$R^{19}$ represents chemical formula (32-1);
$R^{20}$ represents chemical formula (32-2);
$R^{21}$ represents chemical formula (32-3); and
$n^7$ and $n^8$ are any of integers of 0 to 3.)

The polymer for alignment films represented by the aforementioned chemical formula (32) is a polyamic acid including the structure having the hydrogen-drawing type polymerization initiation function and including a vertical alignment group having a cinnamate group as a photoreactive functional group in the side chains.

(Production of Liquid Crystal Cells)

The polymer for alignment films represented by the aforementioned chemical formula (32) was applied to a pair represented by the aforementioned chemical formula (32) which was synthesized by introducing each of the compounds represented by the aforementioned chemical formulas (30) and (31) in 0, 5, 10, 15 mol % of the total amount, and the biphenyl-based compound represented by the aforementioned chemical formula (23) was added as a radical polymerizable monomer to become 0.30 wt % with respect to the total amount of the liquid crystal composition, respectively.

For each of the liquid crystal cells, the polymerization of the radical polymerizable monomers was performed in the same manner as Evaluation Test 1. In Evaluation Test 5, the polymerization reaction was performed without applying a voltage. After that, the polarizing plate was bonded to the outside of the liquid crystal cells to complete the liquid crystal cells.

The aging testing was performed on each of the completed liquid crystal cells, and after the aging testing, the values of VHR (voltage holding ratio), r-DC (residual DC voltage), Δ tilt (tilt angle variations) and residual monomer ratio in liquid crystal layer were measured. The test method of the aging testing and the measurement methods and the measurement conditions of VHR, r-DC, Δ tilt and residual monomer ratio were applied in the same manner as Evaluation Test 1.

The results of VHR, r-DC, Δ tilt and residual monomer ratio of Evaluation Test 5 are shown in Table 8 below.

TABLE 8

|  | Comparison Example 10 | Comparison Example 11 | Comparison Example 12 | Comparison Example 13 |
|---|---|---|---|---|
| Introduction amount of chemical formula (30) (mol %) | 0 | 5 | 10 | 15 |
| Introduction amount of chemical formula (31) (mol %) | 0 | 5 | 10 | 15 |
| VHR (%) | 92.2 | 98.5 | 99.0 | 99.0 |
| r-DC (mV) | 500 | 120 | 110 | 100 |
| Δ tilt (°) | 0.17 | 0.15 | 0.12 | 0.11 |
| Ratio of residual monomers (%) | 65 | 10 | 7 | 3 |

As shown in Table 8, in Comparison Example 10, the value of VHR was at the 92% level, but in Comparison Example 11, the value of VHR was high at 98.5% and in Comparison Examples 12 and 13, the values of VHR were high at 99.0%. In Comparison Example 10, the value of r-DC was very high at 500 mV. When the compounds represented by the aforementioned chemical formulas (30) and (31) were added, the value was substantially lowered. However, in Comparison Examples 11 to 13, the values of r-DC were also 100 mV. In Comparison Example 10, Δ tilt was 0.17°. In Comparison Examples 11 to 13, when the compounds represented by the aforementioned chemical formulas (30) and (31) were added, the values were lowered, but it did not make a great improvement. In Comparison Example 10, the value of residual monomer ratio was very high at 65%. In Comparison Examples 11 to 13, when the compounds represented by the aforementioned chemical formulas (30) and (31) were added, the values were significantly lowered, but the values in Comparison Examples 11 to 13 were approximately 3 to 10%.

When Comparison Examples 11 to 13 of Evaluation Test 5 and Examples 1 to 3 of Evaluation Test 1 to 3 are compared, in Examples 1 to 3, the values of residual monomer ratio were less than 0.1% by introducing the compound represented by the aforementioned chemical formula (14). On the other hand, in Comparison Examples 11 to 13, even though the compounds represented by the aforementioned chemical formulas (30) and (31) were added, the values of residual monomer ratio were approximately 3 to 10%. Further, the values of Δ tilt in Comparison Examples 11 to 13 were more than two times greater than the values of Δ tilt in Examples 1 to 3.

The values of residual monomer ratio of Examples 1 to 3 and Comparison Examples 11 to 13 were reviewed. The alignment films were formed by using the polymer for alignment films having a polymerization initiation function in the side chains, but there is a different point in which in Examples 1 to 3, the compound represented by the aforementioned chemical formula (14) including the structure having the self-cleavage type polymerization initiation function was added to the polymer for alignment films, and in Comparison Examples 11 to 13, the compounds represented by the aforementioned chemical formulas (30) and (31) including the structure having the hydrogen-drawing type polymerization initiation function were added. The self-cleavage type easily generates radicals compared with the hydrogen-drawing type, so that it is considered that the polymerization velocity of radical polymerizable monomers in Examples 1 to 3 is faster than Comparison Examples 11 to 13. Therefore, even though the ultraviolet ray is radiated for the same amount of time, the PSA layer was sufficiently formed in Examples 1 to 3, and on the other hand, the PSA layer was not sufficiently formed and the ratio of residual monomer became high in Comparison Examples 11 to 13.

The values of Δ tilt were reviewed. The vertical alignment films were used in the liquid crystal cells in Evaluation Tests 1 and 5, so that the liquid crystal molecules were arranged vertically with respect to the substrate surface at the time of the absence of an applied voltage, and when the voltage was applied, the liquid crystal molecules tilted in a manner of forming an angle. Since the ratio of monomers remaining in the liquid crystal layer in Comparison Examples 11 to 13, the unreacted radical polymerizable monomers were polymerized by the light from the back light, and the tilt angle was fixed in the state that the liquid crystal molecules were tilted. Therefore, even when it returns to the state of the absence of applied voltage, the angled molecules hardly go back to the vertical angle with respect to the substrate surface. Accordingly, it is considered that Δ tilt in Comparison Examples 11 to 13 of Evaluation Test 5 became greater than Δ tilt in Examples 1 to 3 of Evaluation Test 1.

For the values of r-DC and residual monomer ratio, it was a great improvement when the compounds represented by the aforementioned chemical formulas (30) and (31) were added. However, when it is compared with Examples 1 to 3, the values of r-DC and residual monomer ratio were not sufficient. However, when the additive amount of the compounds represented by the aforementioned chemical formula (30) and (31) increases, the photoreactive functional groups introduced in the side chains of the alignment films were lowered, so that the alignment of the liquid crystal molecules was hardly controlled, and further, it took a long time for the formation of the PSA layer. Due to the long length of time, this is not practical.

The results of Evaluation Tests 1 to 5 are summarized below. In the case in which the alignment films are formed by using the polymer for alignment films including the structure having the self-cleavage type polymerization initiation function and including the photoreactive functional group, the vertical alignment group or the horizontal alignment group, it is understood that even when the light irradiation time is short, a liquid crystal display device that rarely causes image burn-in can be obtained.

DESCRIPTION OF REFERENCE CHARACTERS 3 sealing material
4 radical polymerizable monomer
5, 15 radical 7 polymer layer (PSA layer)
10 array substrate
11, 21 alignment film
20 color filter substrate
30 liquid crystal layer

What is claimed is:

1. A polymer for alignment films, comprising:
a main chain; and
a side chain including a structure represented by chemical formula (1) below:

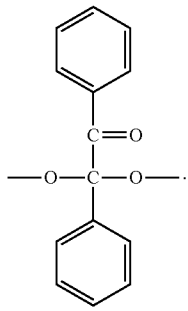

(1)

wherein the polymer for alignment films is a polyamic acid including a structure represented by chemical formula (3) below:

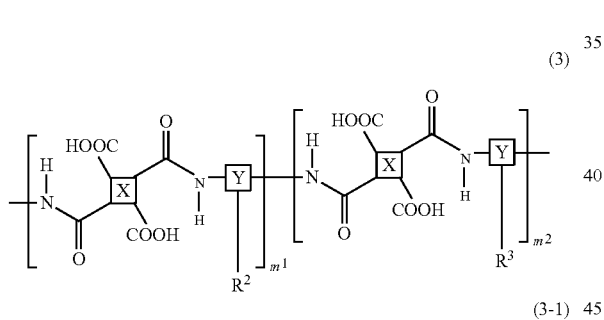

(3)

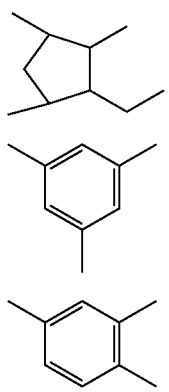

(3-1)

(3-2)

(3-3)

where X is chemical formula (3-1), Y is chemical formula (3-2) or chemical formula (3-3), $m^1$ and $m^2$ are non-negative integers, $R^2$ is a photoreactive functional group, a vertical alignment group, a horizontal alignment group, or a combination thereof, and $R^3$ is chemical formula (5) below:

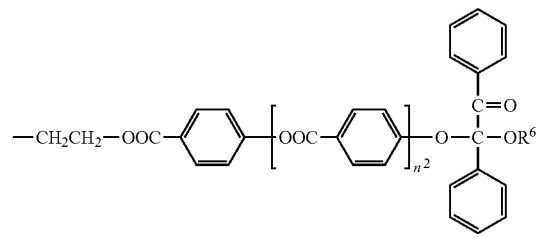

(5)

where $n^2$ is any integer from 0 to 3, $R^6$ is a —H group, a saturated aliphatic hydrocarbon group with a carbon number of 4 or less, or an unsaturated aliphatic hydrocarbon group.

2. The polymer for alignment films according to claim 1, wherein an imidization ratio of the polymer for alignment films is 5 to 95%.

3. A polymer for alignment films, comprising:
a main chain; and
a side chain including a structure represented by chemical formula (1) below:

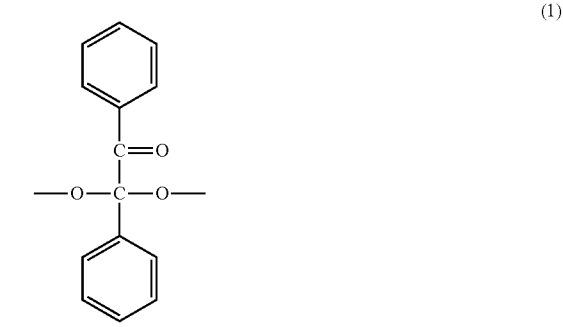

(1)

wherein the polymer for alignment films is a polyimide including a structure represented by chemical formula (4) below:

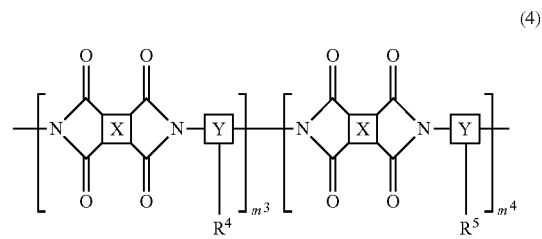

(4)

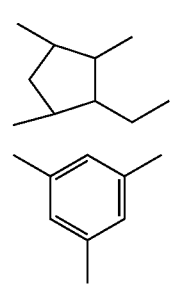

(4-1)

(4-2)

-continued

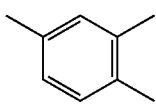
(4-3)

where X is chemical formula (4-1), Y is chemical formula (4-2) or chemical formula (4-3), $m^3$ and $m^4$ are non-negative integers, $R^4$ is a photoreactive functional group, a vertical alignment group, a horizontal alignment group, or a combination thereof, and $R^5$ is chemical formula (5) below:

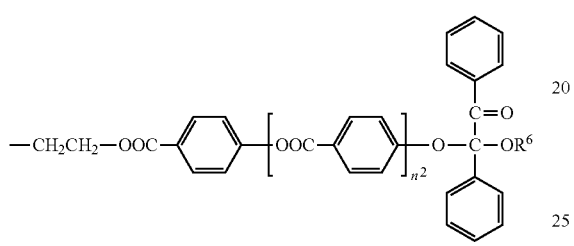
(5)

where $n^2$ is any integer from 0 to 3, $R^6$ is a —H group, a saturated aliphatic hydrocarbon group with a carbon count of 4 or less, or an unsaturated aliphatic hydrocarbon group.

4. The polymer for alignment films according to claim 1, wherein the polymer for alignment films includes a photoreactive functional group, and
wherein the photoreactive functional group is a cinnamate group, a chalcone group, a coumarin group, an azobenzene group, or a tolan group.

5. A liquid crystal display device comprising:
a pair of substrates;
a liquid crystal layer disposed between the pair of substrates;
an alignment film formed on at least one of the pair of substrates; and
a polymer layer on the alignment film, said polymer layer controlling orientation of liquid crystal molecules in the liquid crystal layer,
wherein the alignment film is formed by using a polymer for alignment films that has a main chain and a side chain, said side chain including a structure represented by chemical formula (1) below:

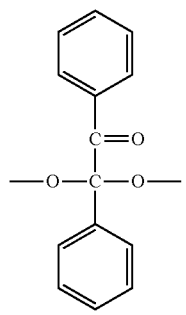
(1)

wherein the polymer for alignment films is a polyamic acid including a structure represented by chemical formula (3) below:

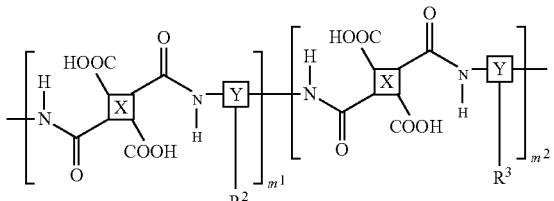
(3)

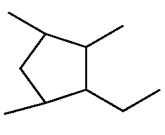
(3-1)

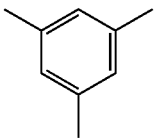
(3-2)

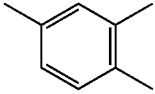
(3-3)

where X is chemical formula (3-1), Y is chemical formula (3-2) or chemical formula (3-3), $m^1$ and $m^2$ are non-negative integers, $R^2$ is a photoreactive functional group, a vertical alignment group, a horizontal alignment group, or a combination thereof, and $R^3$ is chemical formula (5) below:

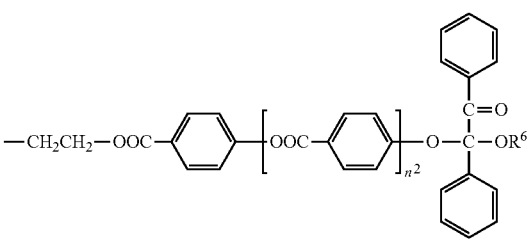
(5)

where $n^2$ is any integer from 0 to 3, $R^6$ is a —H group, a saturated aliphatic hydrocarbon group with a carbon count of 4 or less, or an unsaturated aliphatic hydrocarbon group.

6. The liquid crystal display device according to claim 5, wherein an imidization ratio of the polymer for alignment films is 5 to 95%.

7. A liquid crystal display device comprising:
a pair of substrates;
a liquid crystal layer disposed between the pair of substrates;
an alignment film formed on at least one of the pair of substrates; and
a polymer layer on the alignment film, said polymer layer controlling orientation of liquid crystal molecules in the liquid crystal layer, wherein the alignment film is formed by using a polymer for alignment films that has a main chain and a side chain, said side chain including a structure represented by chemical formula (1) below:

(1)

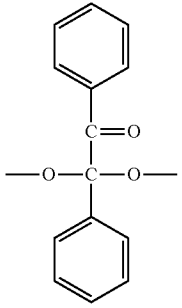

wherein the polymer for alignment films is a polyimide including a structure represented by chemical formula (4) below:

(4)

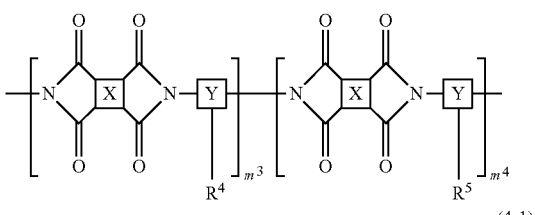

(4-1)

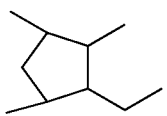

(4-2)

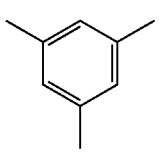

(4-3)

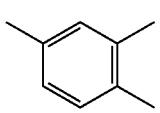

where X is chemical formula (4-1), Y is chemical formula (4-2) or chemical formula (4-3), $m^3$ and $m^4$ are non-negative integers, $R^4$ is a photoreactive functional group, a vertical alignment group, a horizontal alignment group, or a combination thereof, and $R^5$ is chemical formula (5) below:

(5)

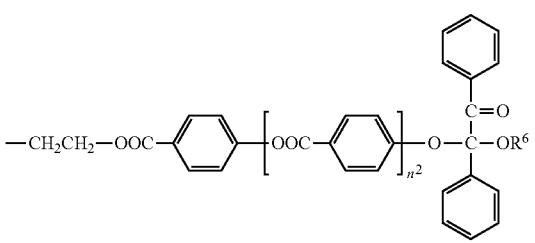

where $n^2$ is any integer from 0 to 3, $R^6$ is a —H group, a saturated aliphatic hydrocarbon group with a carbon count of 4 or less, or an unsaturated aliphatic hydrocarbon group.

8. The liquid crystal display device according to claim 5, wherein the polymer for alignment films includes a photoreactive functional group, and
wherein the photoreactive functional group is a cinnamate group, a chalcone group, a coumarin group, an azobenzene group, or a tolan group.

9. The liquid crystal display device according to claim 5, wherein the polymer layer is formed by polymerizing radical polymerizable monomers.

10. The liquid crystal display device according to claim 9, wherein the radical polymerizable monomers are a compound represented by chemical formula (6) below:

$$P^1\text{-Sp}^1\text{-}R^8\text{-}A^1\text{-}(Z\text{-}A^2)_n3\text{-}R^7 \quad (6)$$

wherein:
$R^7$ represents a —$R^8$-Sp$^1$-P$^1$ group, a hydrogen atom, a halogen atom, a —CN group, an —NO$_2$ group, an —NCO group, an —NCS group, an —OCN group, an —SCN group, an —SF$_5$ group, or a C1 to C18 linear or branched alkyl group;
$P^1$ represents a radical polymerizable group;
$Sp^1$ represents a C1 to C6 linear, branched, or cyclic alkylene or alkyleneoxy group, or a direct bond;
a hydrogen atom in $R^7$ may be substituted with a fluorine atom or a chlorine atom;
a —CH$_2$— group in $R^7$ may be substituted with an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or an —OCO—CH=CH— group as long as an oxygen atom and a sulfur atom are not adjacent to each other;
$R^8$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —COO—CH=CH— group, or a direct bond;
$A^1$ and $A^2$ are the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6- diyl group, a phenanthrene-1,8-diyl group, a phenanthrene-2,7-diyl group, or a phenanthrene-3,6-diyl group;

—$CH_2$— groups in $A^1$ and $A^2$ may be each substituted with an —O— group or an —S— group as long as the groups are not adjacent to each other;

hydrogen atoms in $A^1$ and $A^2$ may be each substituted with a fluorine atom, a chlorine atom, a —CN group, or a C1 to C6 alkyl, alkoxy, alkylcarbonyl, alkoxycarbonyl, or alkylcarbonyloxy group;

Z represents an —O— group, an —S— group, an —NH— group, a —CO— group, a —COO— group, an —COO— group, an —O— COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —COO—CH=CH— group, or a direct bond; and $n^3$ is 0, 1, or 2.

11. The polymer for alignment films according to claim 3, wherein an imidization ratio of the polymer for alignment films is 5 to 95%.

12. The polymer for alignment films according to claim 3, wherein the polymer for alignment films includes a photoreactive functional group, and
wherein the photoreactive functional group is a cinnamate group, a chalcone group, a coumarin group, an azobenzene group, or a tolan group.

13. The liquid crystal display device according to claim 7, wherein an imidization ratio of the polymer for alignment films is 5 to 95%.

14. The liquid crystal display device according to claim 7, wherein the polymer for alignment films includes a photoreactive functional group, and
wherein the photoreactive functional group is a cinnamate group, a chalcone group, a coumarin group, an azobenzene group, or a tolan group.

15. The liquid crystal display device according to claim 7, wherein the polymer layer is formed by polymerizing radical polymerizable monomers.

16. The liquid crystal display device according to claim 15, wherein the radical polymerizable monomers are a compound represented by chemical formula (6) below:

$$P^1\text{-}Sp^1\text{-}R^8\text{-}A^1\text{-}(Z\text{-}A^2)_{n3}\text{-}R^7 \quad (6)$$

wherein:

$R^7$ represents a —$R^8$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a C1 to C18 linear or branched alkyl group;

$P^1$ represents a radical polymerizable group;

$Sp^1$ represents a C1 to C6 linear, branched, or cyclic alkylene or alkyleneoxy group, or a direct bond;

a hydrogen atom in $R^7$ may be substituted with a fluorine atom or a chlorine atom;

a —$CH_2$— group in $R^7$ may be substituted with an —O— group, an —S— group, an —NH— group, a —CO— group, a —COO— group, an —OCO— group, an —O— COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group as long as an oxygen atom and a sulfur atom are not adjacent to each other;

$R^8$ represents an —O— group, an —S— group, an —NH— group, a —CO— group, a —COO— group, an —OCO— group, an —O— COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —COO—CH=CH— group, or a direct bond;

$A^1$ and $A^2$ are the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

—$CH_2$— groups in $A^1$ and $A^2$ may be each substituted with an —O— group or an —S— group as long as the groups are not adjacent to each other;

hydrogen atoms in $A^1$ and $A^2$ may be each substituted with a fluorine atom, a chlorine atom, a —CN group, or a C1 to C6 alkyl, alkoxy, alkylcarbonyl, alkoxycarbonyl, or alkylcarbonyloxy group;

Z represents an —O— group, an —S— group, an —NH— group, a —CO— group, a —COO— group, an —COO— group, an —O— COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —COO—CH=CH— group, or a direct bond; and $n^3$ is 0, 1, or 2.

* * * * *